US011999599B2

(12) United States Patent
Miya et al.

(10) Patent No.: US 11,999,599 B2
(45) Date of Patent: Jun. 4, 2024

(54) BACKSTOP POSITION CHANGING DEVICE FOR CRANE

(71) Applicant: KOBELCO CONSTRUCTION MACHINERY CO., LTD., Hiroshima (JP)

(72) Inventors: Eiji Miya, Hyogo (JP); Taisuke Tsunoo, Hyogo (JP); Hitoshi Sakurai, Hyogo (JP); Hideo Inoue, Hyogo (JP); Kouichiro Nagai, Hyogo (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 311 days.

(21) Appl. No.: 17/636,247

(22) PCT Filed: Aug. 28, 2020

(86) PCT No.: PCT/JP2020/032529
§ 371 (c)(1),
(2) Date: Feb. 17, 2022

(87) PCT Pub. No.: WO2021/049316
PCT Pub. Date: Mar. 18, 2021

(65) Prior Publication Data

US 2022/0289530 A1 Sep. 15, 2022

(30) Foreign Application Priority Data

Sep. 9, 2019 (JP) ................................ 2019-163489

(51) Int. Cl.
*B66C 23/00* (2006.01)
*B66C 23/76* (2006.01)
(Continued)

(52) U.S. Cl.
CPC .............. *B66C 23/76* (2013.01); *B66C 23/82* (2013.01); *B66C 23/92* (2013.01)

(58) Field of Classification Search
CPC ......... B66C 23/76; B66C 23/82; B66C 23/92; B66C 23/823; B66C 23/826; B66C 23/821
See application file for complete search history.

(56) References Cited

U.S. PATENT DOCUMENTS 3,037,641 A * 6/1962 Potter ..................... B66C 23/34 212/295
3,777,900 A * 12/1973 Brewer .................. B66C 23/76 212/197
(Continued)

FOREIGN PATENT DOCUMENTS

DE 102013225219 A1 * 6/2014 ............ B66C 23/82
JP 2007-290782 A 11/2007
(Continued)

OTHER PUBLICATIONS

International Search Report mailed on Oct. 27, 2020 in PCT/JP2020/032529 filed on Aug. 28, 2020 (2 pages).

*Primary Examiner* — Emmanuel M Marcelo
(74) *Attorney, Agent, or Firm* — Oblon, McClelland, Maier & Neustadt, L.L.P.

(57) ABSTRACT

A changing device easily and safely changes the posture of the backstop of a crane between a support posture and a storage posture. The backstop posture changing device is provided with a first support member, a second support member, a push-up mechanism, and a connection member. The first support member and the second support member are rotationally connected to a backstop and a lower boom respectively. When a cylinder rod of the push-up mechanism is extended with respect to a cylinder body, a push-up member pushes up the first support member and the posture
(Continued)

of the backstop is changed from a storage posture on the lower boom to a support posture in which it is possible to support a boom while the crane is in a working posture.

7 Claims, 17 Drawing Sheets

(51) Int. Cl.
*B66C 23/82* (2006.01)
*B66C 23/92* (2006.01)

(56) References Cited

U.S. PATENT DOCUMENTS

| | | | | |
|---|---|---|---|---|
| 2019/0345008 | A1* | 11/2019 | Tsuboi | B66C 23/36 |
| 2021/0269287 | A1* | 9/2021 | Iwazawa | B66C 23/34 |
| 2021/0269289 | A1* | 9/2021 | Kitazumi | B66C 23/76 |

FOREIGN PATENT DOCUMENTS

| | | | | | |
|---|---|---|---|---|---|
| JP | 2014-65577 | A | | 4/2014 | |
| JP | 2019-59595 | A | | 4/2019 | |
| JP | 2022062769 | A | * | 4/2022 | B66C 23/36 |

* cited by examiner

BACKSTOP POSITION CHANGING DEVICE FOR CRANE

TECHNICAL FIELD

The Present invention relates to a backstop posture changing device for crane.

BACKGROUND ART

Conventionally, a crane including a crane body and a derricking body such as a boom, a jib and a mast is known as a crane. The derricking body is supported by the crane body so as to be able to rise and fall around a horizontal rotating axis. As such a crane, it is known that the crane further includes a pair of left and right backstops interposed between the derricking body and the crane body in order to prevent the derricking body from falling backward. Each backstop is freely capable of extending and contracting, and its base end is rotatably supported by the derricking body. At the time of assembling the crane, each backstop is in a support posture in which the backstop intersects with the back surface of the derricking body and can support the derricking body. When the derricking body is raised with respect to the crane body in a state in which each backstop is in the support posture, the front end portion of each backstop comes into contact with a backstop receiving portion provided in the crane body. As a result, the pair of backstops supports the derricking body to prevent further rotation of the derricking body, that is, falling backward of the derricking body.

On the other hand, at the time of transportation or storage of the crane, each backstop described above is rotated with its base end as a fulcrum, and is in a storage posture in which the backstop overlaps the back surface of the derricking body. As a result, it is possible to reduce the space required for the derricking body on the transport vehicle or in the storage location.

Patent Literature 1 discloses a crane including a tower boom, a rear post rotatably supported by a distal end portion of the tower boom, and a backstop cylinder interposed between the tower boom and the rear post in order to maintain a posture of the rear post. The crane further includes a cylinder holding device that supports the backstop cylinder so that the backstop cylinder can be changed between the support posture and the storage posture. The cylinder holding device includes a first link connected to a central portion of the backstop cylinder, a second link connected to the rear post, and a connector for connecting the first link and the second link to each other. The first link and the second link can be bent and extended with the connector as a fulcrum, and the posture of the backstop cylinder can be changed by the bending and extending motion of the links.

CITATION LIST

Patent Literature

Patent Literature 1: Japanese Unexamined Patent Application Publication No. 2007-290782

In the technique described in Patent Document 1, when the crane is assembled, the operator changes the posture of the backstop cylinder to the support posture by rotating the backstop cylinder so that the front end of the backstop cylinder that has been in the storage posture in advance is separated from the rear post. At this time, the cylinder holding device follows the rotation of the backstop cylinder, and the first link and the second link extend with the connector as a fulcrum. When the crane is disassembled, the operator changes the posture of the backstop cylinder to the storage posture by rotating the backstop cylinder so that the front end portion of the backstop cylinder that have been in the support posture approaches the rear post. As described above, in the technique, since the posture change of the backstop cylinder is performed by human power, it is desired to reduce the burden on the operator in the assembling and disassembling work of the crane and to improve the safety.

SUMMARY OF THE INVENTION

The present invention has been made in view of the above problems, and an object of the present invention is to provide a backstop posture changing device for crane capable of easily and safely changing a posture between a supporting posture and a storage posture of a backstop of the crane.

According to the present invention, there is provided a backstop posture changing device for a crane. The crane includes a crane body; a derricking body including a derricking body base end portion rotatably supported by the crane body in a derricking direction and a derricking body distal end portion on the opposite side of the derricking body base end portion a backstop including a backstop base end portion rotatably supported around a horizontal reference rotation center axis at a portion of the derricking body between the derricking body distal end portion and the derricking body base end portion, and a backstop distal end portion disposed on the opposite side of the backstop base end portion. The backstop posture changing device can be attached to the crane. The backstop posture changing device can change the posture of the backstop between the support posture and the storage posture by turning the backstop with the backstop base end portion as a fulcrum in the falling state of the derricking body in which the derricking body is falling down relative to the crane body. In the support posture, the backstop extends obliquely upward from the derricking body in the falling state in such a manner that the backstop restricts the falling backward of the derricking body due to the backstop distal end portion of the backstop being brought into contact with the crane body in accordance with the rising of the derricking body from the falling state. In the storage posture, the backstop distal end portion of the backstop is disposed at a position closer to the derricking body than the support posture. Further, the backstop posture changing device of the crane includes a first support member, a second support member, a push-up mechanism and a connection member. The first support member has a first base end portion connected to a portion of the backstop between the backstop distal end portion and the backstop base end portion so as to be rotatable around a first rotation center axis parallel to the reference rotation center axis, a first rotation end portion opposite to the first base end portion, and a pushed-up portion disposed between the first base end portion and the first rotation end portion. The second support member has a second base end portion connected to a portion of the derricking body between the derricking body base end portion and the backstop base end portion so as to be rotatable around a second rotation center axis parallel to the reference rotation center axis, and a second rotation end portion disposed on the opposite side of the second base end portion and connected to the first rotation end portion of the first support member so as to be relatively rotatable around an intermediate rotation center axis parallel to the reference rotation center axis. The second support member hold the backstop in the support posture with the first support member when a first straight line connecting the first rotation center axis and the intermediate rotation center axis and a second straight line connecting the second rotation center axis and the intermediate rotation center axis form a first angle. Further, the second support member hold the backstop in the storage posture with the first support member when the first straight line and the second straight line form a second angle of an acute angle smaller than the first angle. The push-up mechanism is disposed so as to be interposed between the first support member and the second support member, and includes a cylindrical cylinder body, a cylinder rod and a push-up member. The cylinder body has a base end portion supported by the second support member so as to be rotatable around a first cylinder rotation center axis parallel to the reference rotation center axis. The cylinder rod is inserted into the cylinder body so as to be extendable and contractable with respect to the cylinder body on a side opposite to the base end portion. The push-up member is disposed at a distal end portion of the cylinder rod and capable of pushing up the pushed-up portion of the first support member such that the first straight line and the second straight line form the first angle by the first support member rotating relative to the second support member around the intermediate rotation center axis according to the extending of the cylinder rod relative to the cylinder body from a state in which the first straight line and the second straight line form the second angle. The connection member is detachably attached to at least one of the first support member and the second support member and is capable of connecting the first support member and the second support member to each other so as to hold a state in which the first straight line and the second straight line form the first angle and the backstop is in the support posture.

DESCRIPTION OF EMBODIMENTS

Figure 1:
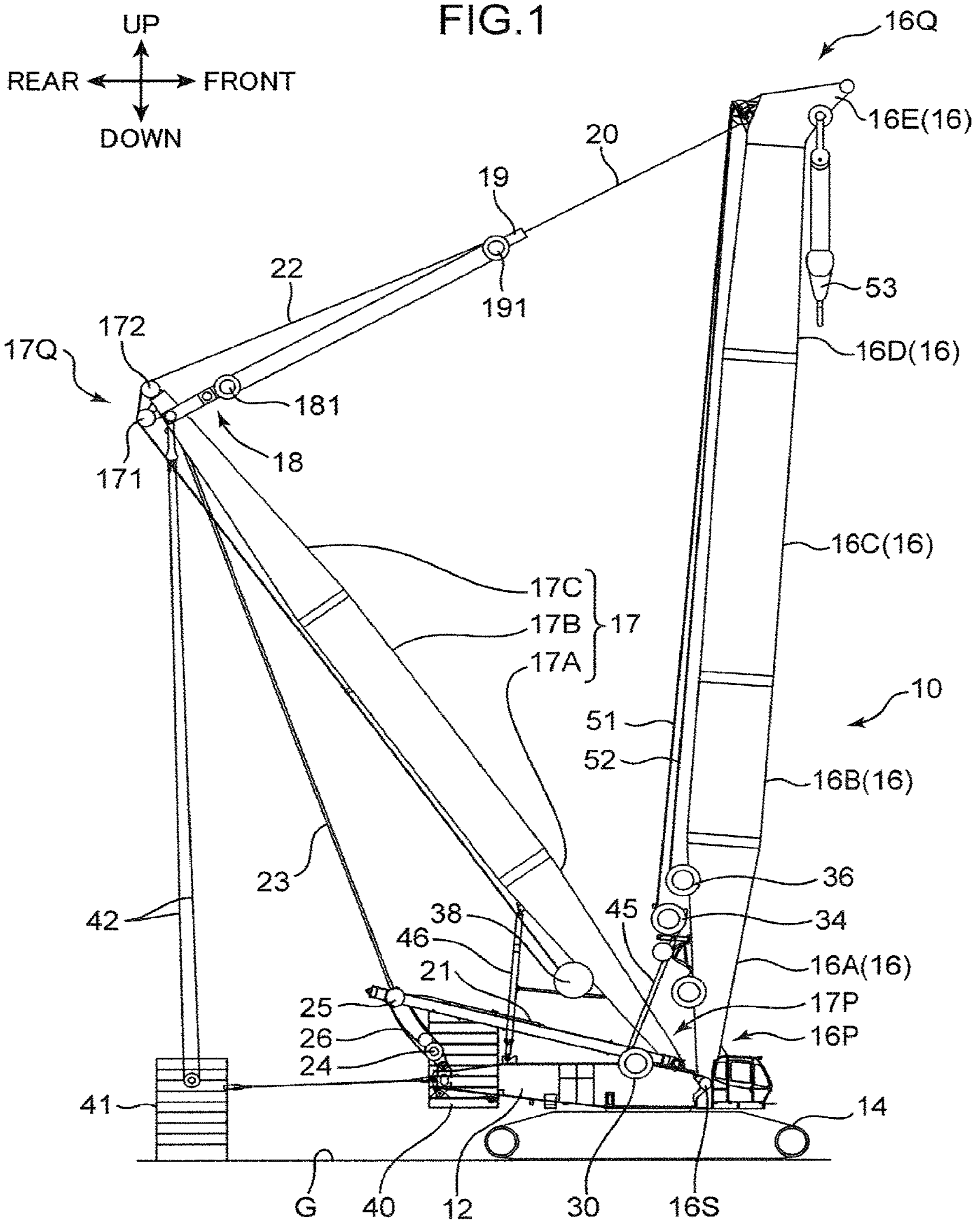
FIG. 1 is a side view of a crane according to an embodiment of the present invention.

Hereinafter, embodiments of the present invention will be described with reference to the drawings. FIG. 1 is a side view of a crane 10 (working machine) according to an embodiment of the present invention. Although the directions of “upper”, “lower”, “front”, and “rear” are shown in the drawings, the directions are shown for convenience for explaining the structure and assembly method of the crane 10 according to the present embodiment, and the moving direction and the use mode of the crane according to the present invention are not limited by the directions.

The crane 10 includes an upper turning body 12 corresponding to the crane body, a lower traveling body 14 rotatably supporting the upper turning body 12 and traveling on the ground G, a boom 16 functioning as a derricking body, a pair of left and right backstops 45, a lattice mast 17 as a boom derricking member, and a box mast 21.

The boom 16 includes a boom base end portion 16P (a derricking body base end portion) rotatably supported by the upper turning body 12 in the derricking direction, and a boom tip portion 16Q (derricking body distal end portion) disposed on the opposite side of the boom base end portion 16P in the longitudinal direction. In the present embodiment, the boom foot 16S provided at the boom base end portion 16P is rotatably supported by a pivotal supporting portion (not shown) of the upper turning body 12. The boom 16 shown in FIG. 1 is a so-called lattice type, and includes a lower boom 16A having the boom foot 16S, one or more intermediate booms 16B, 16C, 16D, and an upper boom 16E. A pair of left and right backstops 45 are provided on the lower boom 16A. The backstops 45 come into contact with the upper turning body 12 when the boom 16 reaches the standing posture (working posture) shown in FIG. 1. Due to this contact, it is restricted that the boom 16 is flapped rearward due to strong wind or the like. The structure of the backstop 45 will be described in detail later.

The lattice mast 17 includes a mast base end portion 17P and a mast tip portion 17Q. The mast base end portion 17P is mounted on the upper turning body 12 so as to be able to rise and fall around a rotation axis parallel to the rotation axis of the boom 16 at a position on the rear side of the boom 16. That is, the lattice mast 17 is also rotatable in the same direction as the derricking direction of the boom 16. The mast tip portion 17Q is a distal end portion of the lattice mast 17 disposed on the opposite side of the mast base end portion 17P in the longitudinal direction. As shown in FIG. 1, a first mast sheave 171 and a second mast sheave 172 are disposed on the mast tip portion 17Q of the lattice mast 17. A boom derricking rope 22, which will be described later, is hung on the first mast sheave 171 and the second mast sheave 172. The lattice mast 17 serves as a strut in the rotation of the boom 16.

A pair of left and right backstops 46 are provided on the mast base end portion 17P side of the lattice mast 17. The backstops 46 are in contact with the upper turning body 12 when the lattice mast 17 reaches the standing posture shown in FIG. 1. Due to this abutment, it is restricted that the lattice mast 17 is flapped rearward due to strong wind or the like.

Further, the crane 10 includes a lower spreader 18, an upper spreader 19, a guy line 20, a boom derricking rope 22, and a boom derricking winch 38.

The lower spreader 18 has a lower sheave block 181. A plurality of sheaves is arranged in the width direction (left-right direction) in the lower sheave block 181.

The upper spreader 19 is disposed at a predetermined interval in front of the lower spreader 18. The upper spreader 19 is connected to the boom tip portion 16Q via the guy line 20. The upper spreader 19 has an upper sheave block 191. A plurality of sheaves is arranged in the width direction (left-right direction) in the upper sheave block 191. A pair of guy lines 20 is disposed in the left-right direction orthogonal to the paper surface of FIG. 1. A rear end portion of the guy line 20 is connected to the upper spreader 19, and a front end portion of the guy line 20 is detachably connected to the boom tip portion 16Q. The guy line 20 includes a guy link (metal plate material), a guy rope, a guy wire (wire rod made of metal), and the like.

The boom derricking rope 22 is pulled out from the boom derricking winch 38, and is hung on the first mast sheave 171 and the second mast sheave 172 of the mast tip portion 17Q, and is wound a plurality of times between the lower sheave block 181 and the upper sheave block 191. The tip portion of the boom derricking rope 22 after being wound around the lower sheave block 181 and the upper sheave block 191 is fixed to the mast tip portion 17Q of the lattice mast 17.

The boom derricking winch 38 is disposed on the mast base end portion 17P side of the lattice mast 17. The boom derricking winch 38 changes the distance between the lower sheave block 181 of the lower spreader 18 and the upper sheave block 191 of the upper spreader 19 by winding and delivering the boom derricking rope 22, and causes the boom 16 to rise and fall while rotating the boom 16 relative to the lattice mast 17.

The box mast 21 has a base end and a turning end (tip), and is rotatably connected to the upper turning body 12 on the rear side of the lattice mast 17. The box mast 21 has a rectangular shape in a cross-sectional view. The rotating shaft of the box mast 21 is arranged in parallel with the rotating shaft of the boom 16 and at the same position as the rotating shaft of the lattice mast 17. That is, the box mast 21 is also rotatable in the same direction as the derricking direction of the boom 16.

Further, the crane 10 includes a guy line 23, a mast derricking rope 26, and a mast derricking winch 30. A pair of guy lines 23 is disposed in the left-right direction orthogonal to the paper surface of FIG. 1. The guy line 23 connects the mast tip portion 17Q of the lattice mast 17 and the turning end of the box mast 21. This connection causes the rotation of the lattice mast 17 and the rotation of the box mast 21 to cooperate with each other. The mast derricking rope 26 is wound a plurality of times between a sheave block 24 arranged in the upper turning body 12 and having a plurality of sheaves arranged in the width direction, and a sheave block 25 arranged at the turning end of the box mast 21 and having a plurality of sheaves arranged in the width direction.

The mast derricking winch 30 is disposed on the base end side of the box mast 21. The mast derricking winch 30 winds up and feeds the mast derricking rope 26. The distance between the sheave block 25 at the tip of the box mast 21 and the sheave block 24 at the rear end of the upper turning body 12 is changed by winding and feeding operation of the mast derricking winch 30, and the lattice mast 17 are raised and lowered while the box mast 21 and the lattice mast 17 are integrally rotated with respect to the upper turning body 12.

The crane 10 is equipped with a main winding winch 34 and an auxiliary winding winch 36 for hoisting and lowering the suspended load other than the above-described mast derricking winch 30 and the boom derricking winch 38. In the crane 10 according to the present embodiment, both the main winding winch 34 and the auxiliary winding winch 36 are installed on the lower boom 16 of the boom 16. The winches 34 and 36 of the crane 10 may be mounted on the upper turning body 12.

The main winding winch 34 performs hoisting and lowering of the suspended load by the main winding rope 51 (FIG. 1). For this main winding, a main winding guide sheave (not shown) is rotatably provided on the boom tip portion 16Q of the boom 16, and a main winding sheave block in which a plurality of main winding point sheaves is arranged in a width direction is provided at a position adjacent to the main winding guide sheave. A main hook 53 for a suspended load is connected to the main winding rope 51 suspended from the main winding sheave block. The main winding rope 51 drawn out from the main winding winch 34 is sequentially hung on the main winding guide sheave, and stretched between the sheave of the main winding sheave block and the sheave of the sheave block provided on the main hook 53. Therefore, when the main winding winch 34 winds or feeds the main winding rope 51, the main hook 53 is wound up and down.

Similarly, the auxiliary winding winch 36 performs hoisting and lowering of the suspended load by the auxiliary winding rope 52. The auxiliary winding is provided with a structure (not shown) similar to the main winding described above. When the auxiliary winding winch 36 winds and feeds the auxiliary winding rope 52, the auxiliary hook for the suspended load, which is connected to the end of the auxiliary winding rope 52, is wound up and down.

A counterweight 40 for adjusting the balance of the crane 10 is loaded on the rear part of the upper turning body 12, and the pallet weight 41 is further arranged behind the upper turning body 12. The pallet weight 41 has a function of keeping the balance of the crane 10 as a weight for SHL (Super Heavy Lifting) provided for lifting the heavy object by the crane 10. The pallet weight 41 is connected to the mast tip portion 17Q of the lattice mast 17 by the weight line 42.

Figure 2:
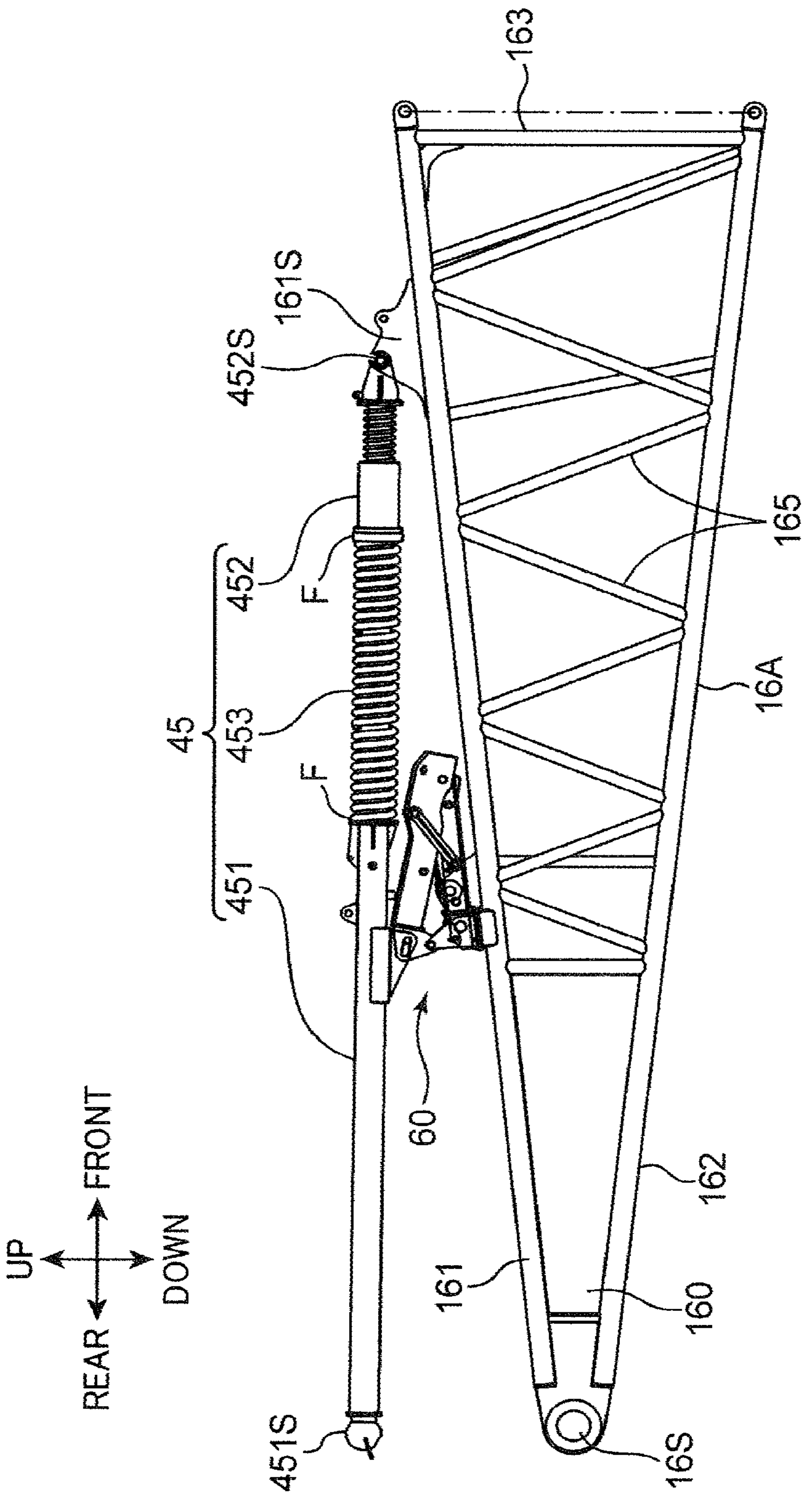
FIG. 2 is a side view of a lower boom and a backstop in a state in which a boom of a crane according to an embodiment of the present invention is in a falling posture.
Figure 3:
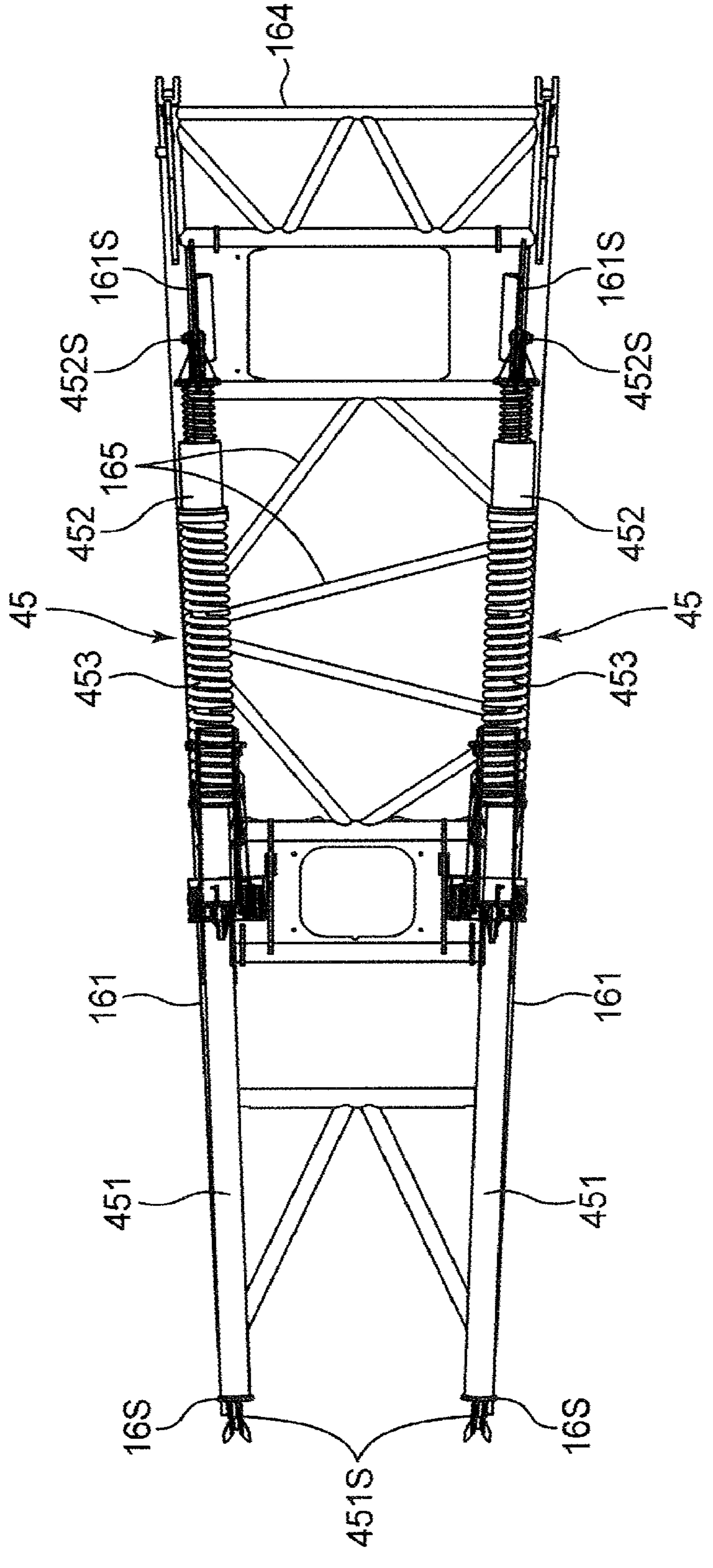
FIG. 3 is a plan view of a lower boom and a backstop in a state in which a boom of a crane according to an embodiment of the present invention is in a falling posture.
Figure 4:
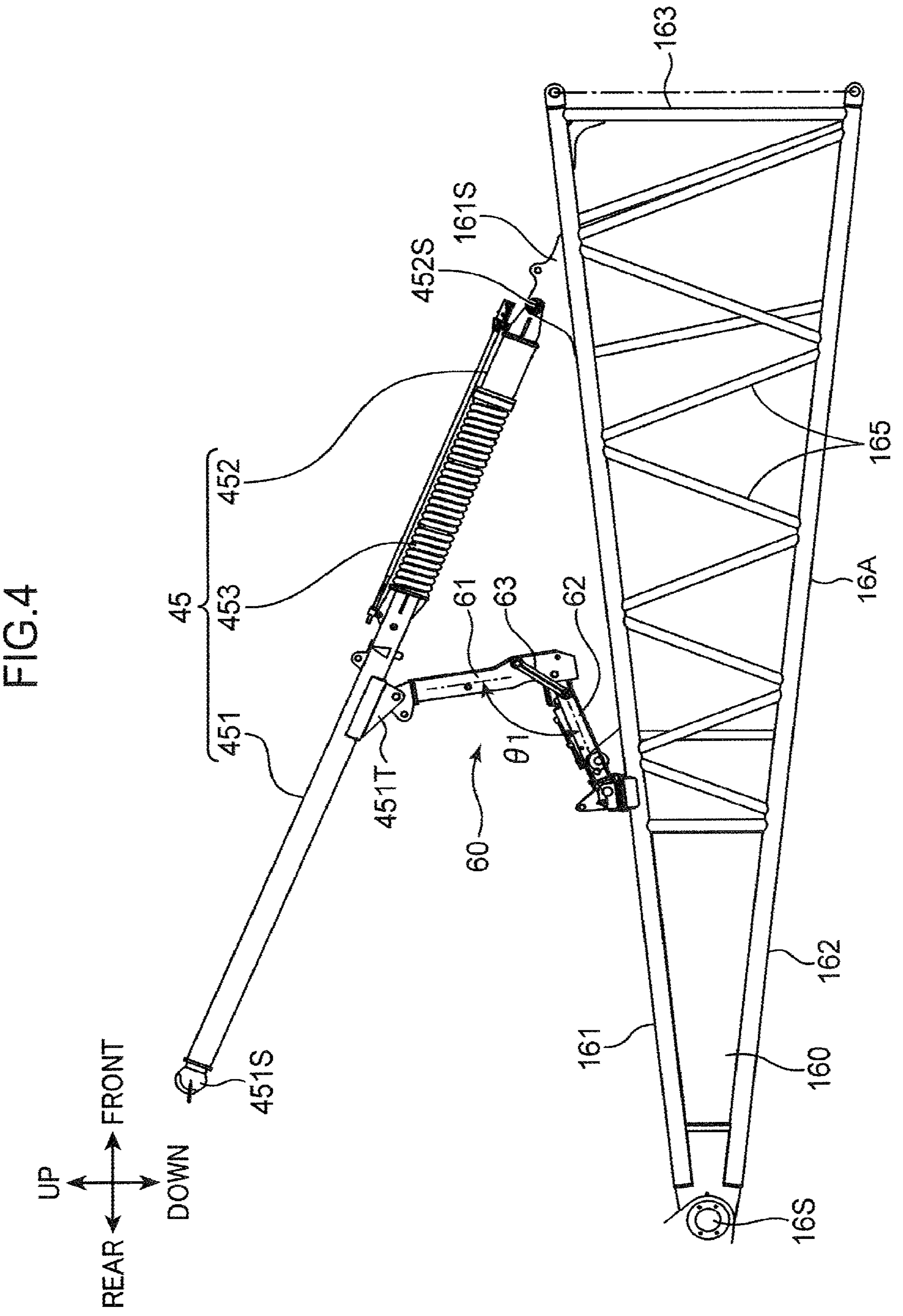
FIG. 4 is a side view of a crane according to an embodiment of the present invention in which a backstop is in a support posture by a backstop posture changing device.
Figure 5:
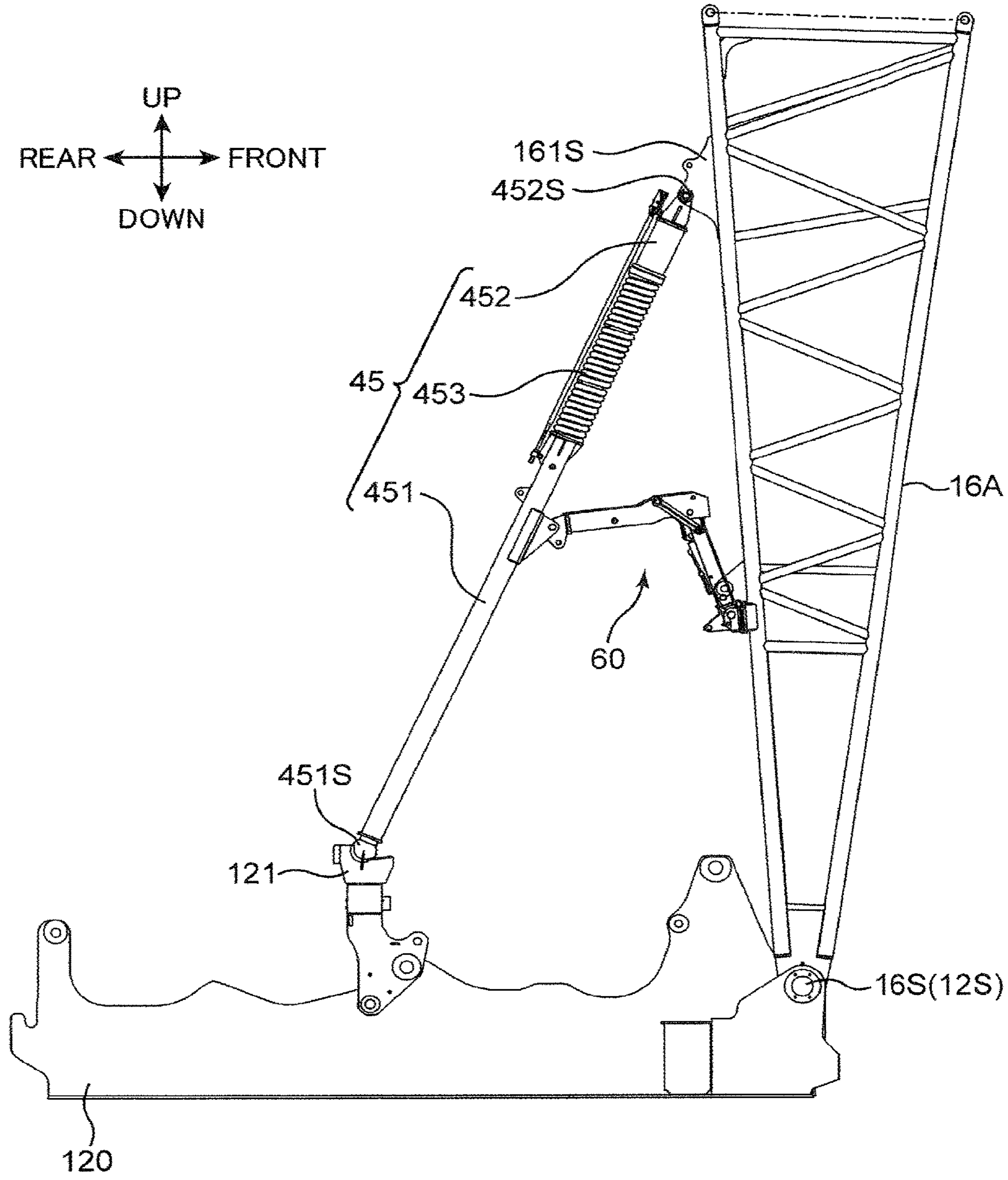
FIG. 5 is a side view of the crane according to the embodiment of the present invention in which the backstop is in a support posture by the backstop posture changing device and the boom is erected.

FIG. 2 and FIG. 3 are a side view and a plan view of the lower boom 16A and the backstop 45 in a state in which the boom 16 of the crane 10 according to the present embodiment is in a falling posture. FIG. 4 is a side view of the crane 10 according to the present embodiment in a state in which the backstop 45 is in a support posture by a backstop lifting device 60 (backstop posture changing device). FIG. 5 is a side view of the crane 10 according to the present embodiment in which the backstop 45 is in a support posture by the backstop lifting device 60 and the boom 16 stands.

Referring to FIGS. 2 to 5, when the boom 16 (lower boom 16A) is viewed in a falling state with respect to the upper turning body 12, the lower boom 16A includes a pair of left and right lower frames 160, a pair of left and right first main pipes 161, a pair of left and right second main pipes 162, a pair of left and right first connection pipes 163, a pair of upper and lower second connection pipes 164, and a plurality of lattice pipes 165.

The pair of left and right first main pipes 161 and the pair of right and left second main pipes 162 are pipes defining the outer shape of the lower boom 16A, and extend from the vicinity of the boom foot 16S toward the distal end side of the lower boom 16A so that the interval between the first and second main pipes 161, 162 extends from the vicinity of the boom foot 16S to the tip side of the lower boom 16A, as shown in FIG. 2 or the like. The lower frame 160 is a plate-like member that connects the base ends of the first main pipe 161 and the second main pipe 162 to each other on both left and right sides of the lower boom 16A. The pair of left and right first connection pipes 163 connect the respective tips of the first main pipe 161 and the second main pipe 162 to each other. Further, the pair of upper and lower second connection pipes 164 connect the tips of the pair of right and left first main pipes 161 and the tips of the pair of right and left second main pipes 162 to each other. The plurality of lattice pipes 165 connect the first main pipe 161 and the second main pipe 162, the pair of left and right first main pipes 161 to each other, and the pair of right and left second main pipes 162 to each other at a plurality of positions.

Further, the lower boom 16A has a pair of left and right brackets 161S. The pair of left and right brackets 161S are disposed on the first main pipe 161 at a position closer to the tip of the first main pipe 161 between the boom foot 16S and the tip of the first main pipe 161. The bracket 161S rotatably supports a backstop fulcrum portion 452S of the backstop 45 to be described later.

As described above, the crane 10 includes the pair of left and right backstop tops 45. The crane 10 further includes a pair of left and right backstop lifting devices 60 (backstop posture changing device) that can be mounted so as to be interposed between the backstops 45 and the boom 16 of the crane 10. Each backstop 45 is disposed on the pair of left and right first main pipes 161. Since the structures and functions of the pair of right and left backstop tops 45 and the pair of right and left backstop lifting devices 60 are the same, the backstop 45 and the backstop lifting device 60 on the right side (the front side of the paper surface of FIG. 2) will be described hereinafter.

The backstop 45 includes a backstop lower portion 451, a backstop upper portion 452, and a backstop spring 453. The backstop lower portion 451 and the backstop upper portion 452 are formed of a cylinder structure, and the backstop lower portion 451 is inserted into the cylindrical interior of the backstop upper portion 452 so as to extend and contract. The backstop spring 453 is compressed between flanges F (FIG. 2) provided on the backstop lower portion 451 and the backstop upper portion 452, respectively.

The backstop lower portion 451 has a backstop abutting portion 451S, and the backstop upper portion 452 has a backstop fulcrum portion 452S. The backstop fulcrum portion 452S corresponds to a base end portion (backstop base end portion) of the backstop 45, and the backstop abutting portion 451S corresponds to a tip portion (backstop distal end portion) of the backstop 45 on the opposite side of the backstop fulcrum portion 452S. As described above, the backstop fulcrum portion 452S is rotatably supported around a horizontal rotation center axis (a rotation center axis extending in the left-right direction of the upper turning body 12, and a reference rotation center axis) on a bracket 161S disposed on the lower boom 16A at a portion of the distal end side (the boom tip portion 16Q side) of the lower boom 16A than the boom foot 16S.

Referring to FIG. 5, the upper turning body 12 includes a turning frame 120, and the turning frame 120 includes a support portion 12S rotatably supporting the boom foot 16S and a pair of left and right backstop receiving portions 121. In FIG. 5, only the backstop receiving portion 121 on the right side (the front side of the paper surface) appears.

The backstop lifting device 60 can change the posture of the backstop 45 between the support posture (FIG. 4) and the storage posture (FIG. 2) by rotating the backstop 45 with the backstop fulcrum portion 452S as a fulcrum in a falling state of the boom 16 in which the boom 16 is fallen with respect to the upper turning body 12. In the support posture, the backstop 45 extends obliquely upward from the boom 16 (lower boom 16A) in the falling state (see FIG. 4) in such a manner that the backstop 45 restricts the falling backward of the boom 16 due to the backstop abutting portion 451S of the backstop 45 being brought into contact with the upper turning body 12 in accordance with the rising of the boom 16 from the falling state. On the other hand, in the storage posture, the backstop abutting portion 451S of the backstop 45 is disposed at a position closer to the lower boom 16A (boom 16) than the support posture. Therefore, as shown in FIGS. 2 and 4, the backstop lifting device 60 is disposed in a space between the backstop 45 and the first main pipe 161 of the lower boom 16A.

Figure 6:
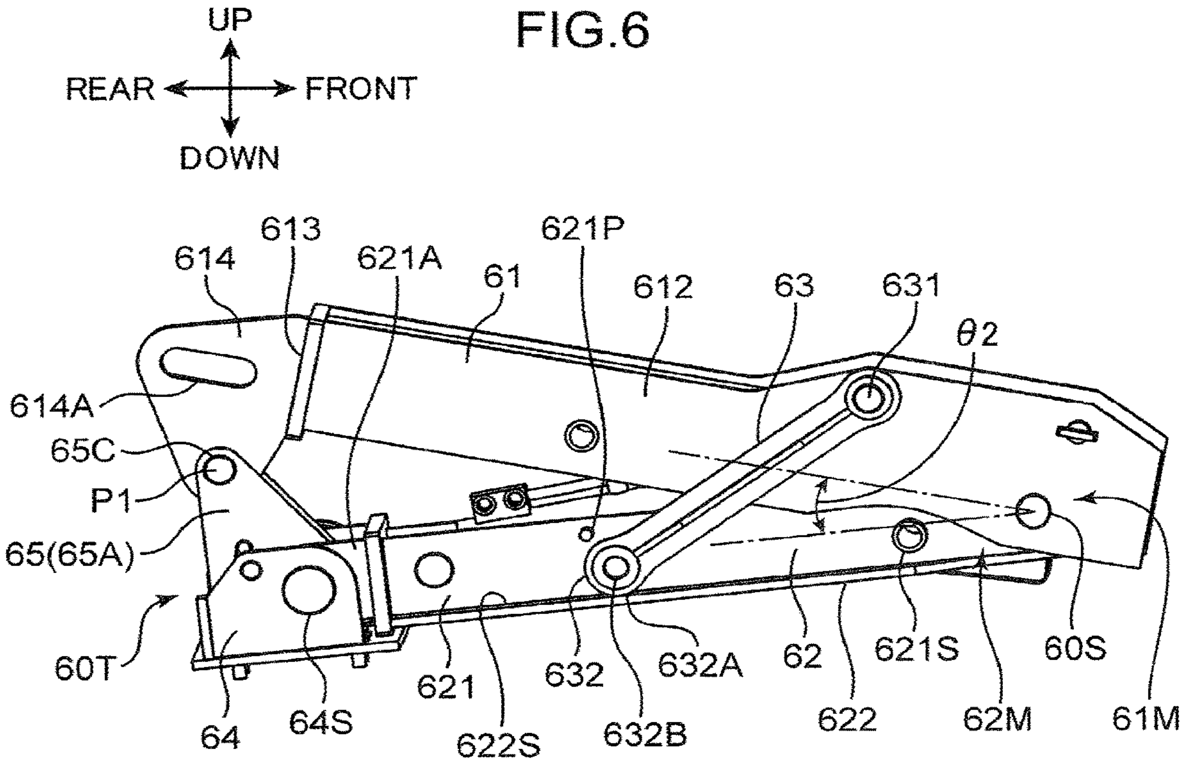
FIG. 6 is a side view of a backstop posture changing device in a crane according to an embodiment of the present invention.
Figure 7:
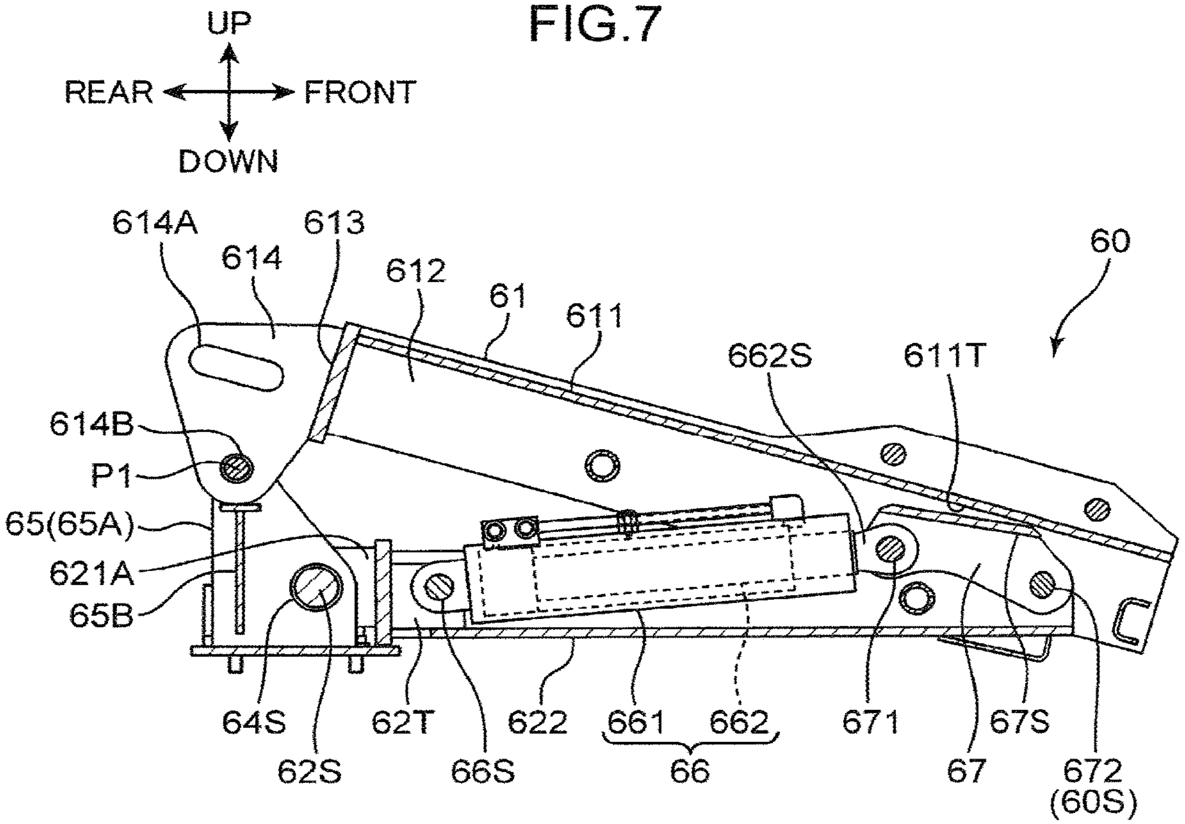
FIG. 7 is a side cross-sectional view of a backstop posture changing device in a crane according to an embodiment of the present invention.
Figure 8:
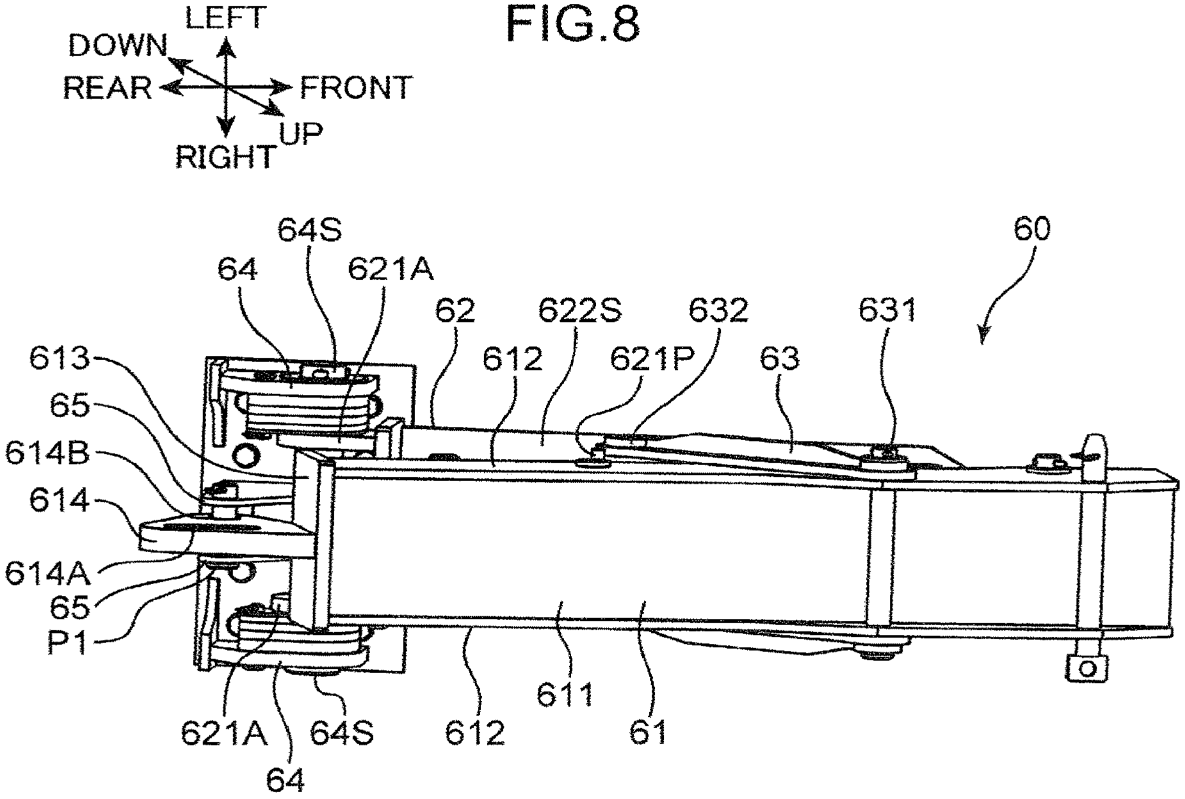
FIG. 8 is a perspective view of a backstop posture changing device in a crane according to an embodiment of the present invention.

FIG. 6, FIG. 7, and FIG. 8 are a side view, a side sectional view, and a perspective view of the backstop lifting device 60 in the crane 10 according to the present embodiment. These figures correspond to the storage posture of the backstop 45.

The backstop lifting device 60 includes a first arm 61 (first support member), a second arm 62 (second support member), a pair of left and right stoppers 63 (connection members), a support portion 60T including a second arm support portion 64 and a first arm fixing portion 65, and a lifting cylinder 66 (push-up mechanism).

The first arm 61 and the second arm 62 are relatively rotatably connected around a rotation center axis extending in the left-right direction in the arm fulcrum portion 60S (FIG. 6).

The first arm 61 is a member extending in a predetermined longitudinal direction, and has a substantially U-shape in a cross-sectional view orthogonal to the longitudinal direction. Specifically, the first arm 61 includes a first base portion 611, a pair of left and right first side portions 612, an arm end portion 613, and a first connection portion 614.

In FIG. 7, the first base portion 611 constitutes an upper surface portion of the first arm 61, and connects the pair of left and right first side portions 612 to each other in the left-right direction. That is, the U-shaped cross section is funned by the first base portion 611 and the pair of left and right first side portions 612. Here, as shown in FIG. 7, the pushed-up portion 611T is formed in a region near the arm fulcrum portion 60S of the lower surface (rear surface) of the first base portion 611. The pushed-up portion 611T has a function of being pushed up by the push-up portion 67S (FIG. 7) of the push-up member 67 described later.

The arm end portion 613 is disposed so as to connect one end portions of the first base portion 611 and the pair of left and right first side portions 612 to each other. In other words, the arm end portion 613 is disposed so as to be orthogonal to the first base portion 611 and the pair of left and right first side portions 612. The first connection portion 614 is a plate-shaped portion disposed so as to protrude from a central portion in the left-right direction of the arm end portion 613. The first connection portion 614 has a substantially triangular shape in a side view, and a connecting opening 614A and a fixing opening 614B disposed in the vicinity of the apex of the first connection portion 614 are formed. The connecting opening 614A is a long hole opened along the longitudinal direction of the first arm 61 of the first connection portion 614. And a connecting pin (not shown) is inserted into the connecting opening 614A and a hole portion (not shown) opened in the bracket 45T (FIG. 4) of the backstop lower portion 451, so that the first connection portion 614 of the first arm 61 is rotatably supported around the rotation center axis extending in the left-right direction in the backstop 45 (backstop lower portion 451). On the other hand, the fixing opening 614B is an opening for detachably fixing the first connection portion 614 to the first arm fixing portion 65 by a lifting device fixing pin P1 (FIG. 7) (storage connection member).

In other words, with respect to the first arm 61, the first arm 61 has a first connection portion 614 (first base end portion) connected to a portion of the backstop 45 closer to the backstop abutting portion 451S than the backstop fulcrum portion 452S so as to be rotatable around a first rotation center axis parallel to the reference rotation center axis, and the tip portion 61M (first rotational end portion) (FIG. 6) on the opposite side of the first connection portion 614, and a pushed-up portion 611T disposed between the first connection portion 614 and the tip portion 61M.

The second arm 62 is a member extending in a predetermined longitudinal direction, and has a substantially U-shape in a cross-sectional view orthogonal to the longitudinal direction. Specifically, the second arm 62 includes a pair of left and right second side portions 621 and a second base portion 622.

In FIGS. 6 and 7, the second base portion 622 constitutes the lower surface portion of the second arm 62, and connects the pair of left and right second side portions 621 to each other in the left-right direction. That is, a U-shaped cross section is formed by the second base portion 622 and the pair of left and right second side portions 621. The width of the second arm 62 in the left-right direction is set to be smaller than the width of the first arm 61 in the left-right direction. Therefore, as shown in FIG. 6, the first arm 61 and the second arm 62 rotatable with respect to each other with the arm fulcrum portion 60S as a fulcrum have such a dimensional relationship that the second arm 62 can be accommodated inside the first arm 61.

The second base portion 622 has a dimension protruding outward in the left-right direction from the pair of left and right second side portions 621, and a stopper guide portion 622S (FIG. 6) (guide portion) is formed at a portion of the second base portion 622 that protrudes further outward in the left-right direction than the second side portion 621.

The stopper guide portion 622S extends along the longitudinal direction of the second arm 62, and has a function of guiding a stopper tip portion 632 of the stopper 63 described later. The stopper guide portion 622S holds the stopper tip portion 632 of the stopper 63 described later in the storage posture of the backstop 45 at a standby position that is closer to the second arm fulcrum portion 62S than the stopper fixing hole 621S (FIG. 6) and the stopper guide portion 622S guides the stopper tip portion 632 of the stopper 63 that rotates around the stopper fulcrum portion 631 from the standby position to the stopper fixing hole 621S as the cylinder rod 662 extends relative to the cylinder body 661.

A stopper fixing hole 621S (connected portion) is formed at an end portion of the second side portion 621 on the arm fulcrum portion 60S side. The stopper fixing hole 621S is disposed between the second arm fulcrum portion 62S and the tip portion 62M, and allows the stopper tip portion 632 (stopper hole portion 632B) of the stopper 63 to be detachably connected to the stopper fixing hole 621S by an arm of fixing pin P2 (FIG. 13) so as to hold the supporting posture of the backstop 45. A stopper restricting portion 621P (connection member restraining portion) is provided in a protruding manner at a substantially central portion of each of the second side portions 621 in the longitudinal direction. The stopper restricting portion 621P is a substantially columnar projection, and has a function of temporarily restraining the stopper tip portion 632 of the stopper 63 to be described later. Further, a second connection portion 621A is disposed at an end portion of the pair of left and right second side portions 621, respectively. Each of the second connection portions 621A has a second arm fulcrum portion 62S (FIG. 7). The second arm fulcrum portion 62S is rotatably supported around a rotation center axis extending in the left-right direction on the bearing portion 64S of the second arm support portion 64. As shown in FIG. 7, the second arm 62 further includes a cylinder support portion 62T provided at an end portion on the second connection portion 621A side of the second base portion 622 and rotatably supporting the lifting cylinder 66 to be described later.

In other words, the second arm 62 has a second arm fulcrum portion 62S (second base end portion) connected to a portion between the boom foot 16S and the backstop fulcrum portion 452S on the first main pipe 161 of the lower boom 16A (boom 16) so as to be rotatable around a second rotation center axis parallel to the reference rotation center axis, and a tip portion 62M (second rotation end portion) (FIG. 6) disposed on the opposite side of the second arm fulcrum portion 62S and connected to the tip portion 61M of the first arm 61 so as to be relatively rotatable around an intermediate rotation center axis parallel to the reference rotation center axis.

Further, in addition to the first arm 61 and the second arm 62, the second arm 62 holds the backstop 45 in the support posture together with the first arm 61 by arranging a first straight line connecting the first rotation center axis and the intermediate rotation center axis and a second straight line connecting the second rotation center axis and the intermediate rotation center axis so as to for in a first angle θ1 (FIG. 4). On the other hand, the second arm 62 holds the backstop 45 in the storage posture together with the first arm 61 by arranging the first straight line and the second straight line so as to form a second angle θ2 (FIG. 6) that is an acute angle smaller than the first angle.

The pair of left and right stoppers 63 are rotatably supported by the first support member and detachably attached to the second arm 62. Each stopper 63 connects the first arm 61 and the second arm 62 to each other such that the first arm 61 and the second arm 62 hold the first angle θ1 and the backstop 45 is in the support posture. Specifically, as shown in FIG. 6, the stopper 63 has a link shape extending in a direction orthogonal to the left-right direction, and has a stopper fulcrum portion 631 (connection base end portion) and a stopper tip portion 632 (connection distal end portion) disposed at both ends of the stopper 63. The stopper fulcrum portion 631 is rotatably supported around a rotation center axis extending in the left-right direction at a portion of the first side portion 612 of the first arm 61 at a distance from the arm fulcrum portion 60S to the first connection portion 614 side. The stopper tip portion 632 is disposed on the opposite side of the stopper fulcrum portion 631, and has a tip outer peripheral portion 632A and a stopper hole portion 632B. By inserting the arm fixing pin P2 into the stopper hole portion 632B, the stopper tip portion 632 of the stopper 63 is fixed to the stopper fixing hole 621S (FIG. 6). The tip outer peripheral portion 632A is the outer peripheral portion of the stopper tip portion 632, and moves on the stopper guide portion 622S of the second arm 62 in accordance with the posture change of the backstop 45.

The support portion 60T is fixed to the first main pipe 161 of the lower boom 16A. As described above, the pair of left and right second arm support portions 64 of the support portion 60T support the pair of left and right second connection portions 621A of the second arm 62 so as to be rotatable about a rotation center axis extending in the left-right direction.

The first arm fixing portion 65 of the support portion 60T is disposed between the pair of left and right second arm support portions 64, and has a function of temporarily fixing the first connection portion 614 of the first arm 61. The first arm fixing portion 65 includes a pair of left and right side plates 65A and a support plate 65B having a T-shaped cross section and arranged between the side plates 65A. As shown in FIG. 7, the support plate 65B can support the lower end portion of the first connection portion 614 from below. In this time, the hole portion 65C formed at the upper end portion of the first arm fixing portion 65 and the fixing opening 614B of the first connection portion 614 coincide with each other in the left-right direction, and the lifting device fixing pin P1 can be mounted.

As shown in FIGS. 6 and 7, the lifting cylinder 66 is disposed between the pair of left and right second side portions 621 of the second arm 62 so as to be interposed between the first arm 61 and the second arm 62. The lifting cylinder 66 includes a cylinder body 661, a cylinder rod 662, and a push-up member 67. The cylinder body 661 and the cylinder rod 662 constitute a hydraulic cylinder. The cylinder body 661 is formed of a tubular (cylindrical) member. The cylinder body 661 includes a base end portion supported by the cylinder support portion 62T of the second arm 62 so as to be rotatable around a cylinder fulcrum portion 66S (first cylinder rotation center axis) parallel to the reference rotation center axis. On the other hand, the cylinder rod 662 is inserted into the internal space of the cylinder body 661 so as to extend and contract with respect to the cylinder body 661 on the side opposite to the base end of the cylinder body 661.

The push-up member 67 (FIG. 7) is disposed at the tip of the cylinder rod 662. The push-up member 67 can push up the pushed-up portion 611T (FIG. 7) of the first arm 61 so that the first arm 61 relatively rotates around the arm fulcrum portion 60S (intermediate rotation center axis) with respect to the second arm 62 in accordance with the extending of the cylinder body 661 relative to the cylinder rod 662 from a state in which the first arm 61 (first straight line) and the second arm 62 (second straight line) form the second angle θ2, thereby the first arm 61 and the second arm 62 form the first angle θ1.

The push-up member 67 has a first fulcrum portion 671 (first supported portion), a second fulcrum portion 672 (second supported portion), and a push-up portion 67S. The first fulcrum portion 671 is supported by a rod tip portion 662S (tip portion) of the cylinder rod 662 so as to be rotatable about a rotation center axis (second cylinder rotation center axis) parallel to the reference rotation center axis. The second fulcrum portion 672 is supported by the tip portion 62M of the second arm 62 so as to be rotatable about the arm fulcrum portion 60S (intermediate rotation center axis).

The push-up portion 67S is disposed between the first fulcrum portion 671 and the second fulcrum portion 672, and is a flat portion capable of pushing up the pushed-up portion 611T of the first arm 61 as the cylinder rod 662 extends relative to the cylinder body 661.

Figure 9:
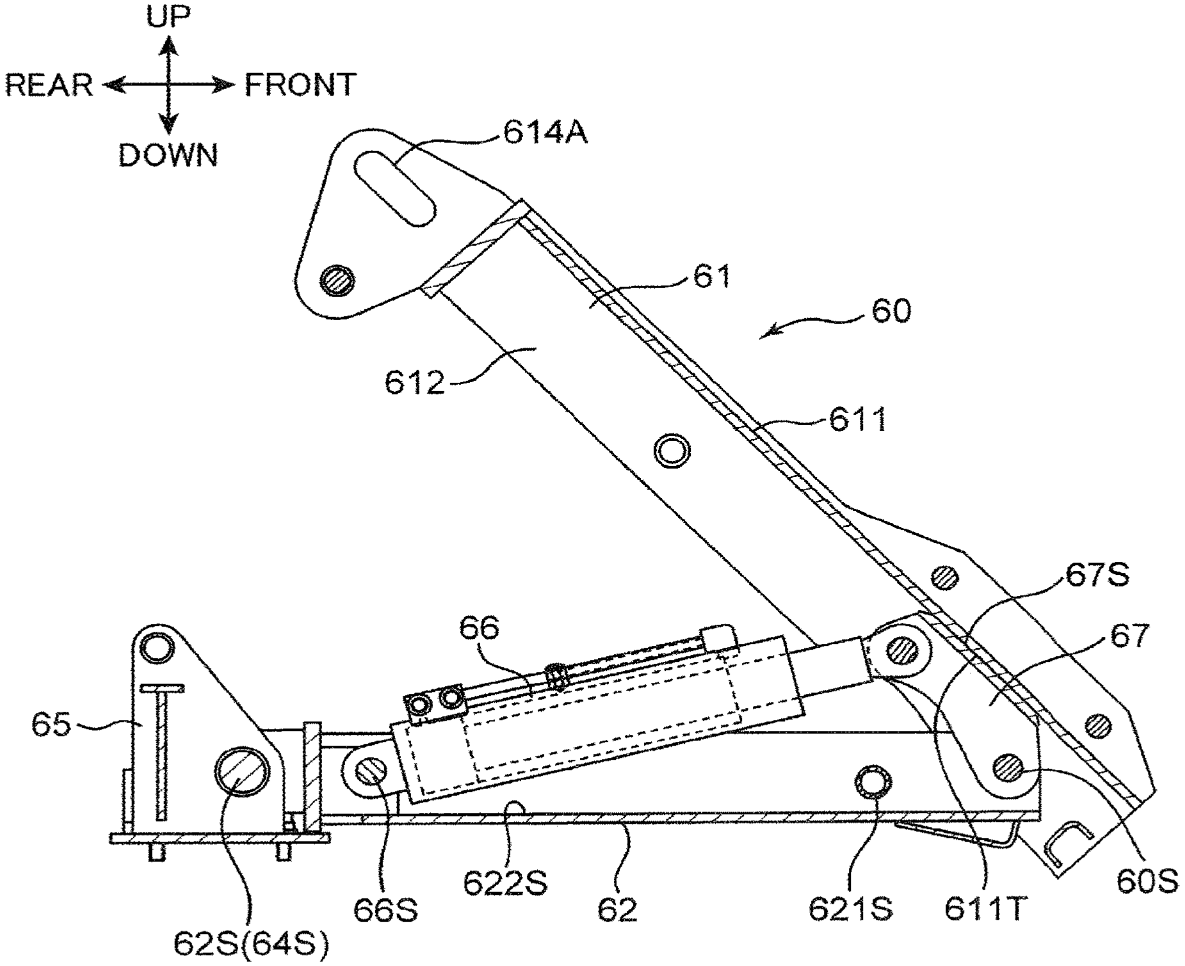
FIG. 9 is a side cross-sectional view of a backstop posture changing device in a crane according to an embodiment of the present invention.

Next, the lifting operation (posture changing operation) of the backstop 45 by the backstop lifting device 60 will be described. FIG. 9 is a side cross-sectional view of the backstop lifting device 60 in the crane 10 according to the present embodiment. Each of FIGS. 10 to 13 is a side view of the backstop lifting device 60 in the crane 10 according to the present embodiment.

In the so-called storage state (FIG. 2, FIG. 6 and FIG. 7) in which the backstop 45 is placed on the lower boom 16A of the boom 16, when the posture change of the backstop 45 is started, the operator removes the lifting device fixing pin P1 (FIG. 6) in advance. As a result, the connection between the first arm 61 and the second arm 62 is released, and the extension operation of the backstop lifting device 60 (the first atm 61 and the second arm 62) can be performed. Then, the control unit (not shown) controls the hydraulic circuit (see FIG. 14) of the backstop lifting device 60 on the basis of the operation command by the operator, thereby the cylinder rod 662 of the lifting cylinder 66 starts to extend relative to the cylinder body 661. At this time, first, the push-up portion 67S of the push-up member 67 of FIG. 7 comes into contact with the pushed-up portion 611T of the first arm 61 from below. When the push-up portion 67S pushes up the first base portion 611 upward in accordance with the extension operation of the cylinder rod 662, the first arm 61 moves upward while rotating relative to the second arm 62. As a result, the backstop 45 connected to the first connection portion 614 of the first arm 61 rotates upward with the backstop fulcrum portion 452S as a fulcrum (FIG. 9). In the state change from FIG. 7 to FIG. 9, while the stopper 63 is rotated with the stopper fulcrum portion 631 as a fulcrum, the tip outer peripheral portion 632A of the stopper tip portion 632 moves on the stopper guide portion 622S of the second arm 62 so as to approach the stopper fixing hole 621S.

In the present embodiment, since the first connection portion 614 is connected to the backstop 45 and the distance between the connection portion and the backstop fulcrum portion 452S is substantially fixed, the second arm 62 is pulled upward by the first arm 61 as the cylinder rod 662 extends. Therefore, the angle formed by the second arm 62 and the first main pipe 161 of the lower boom 16A is also increased. Therefore, according to the limited extension stroke of the cylinder body 661, the backstop 45 can be efficiently raised to a predetermined height.

Figure 10:
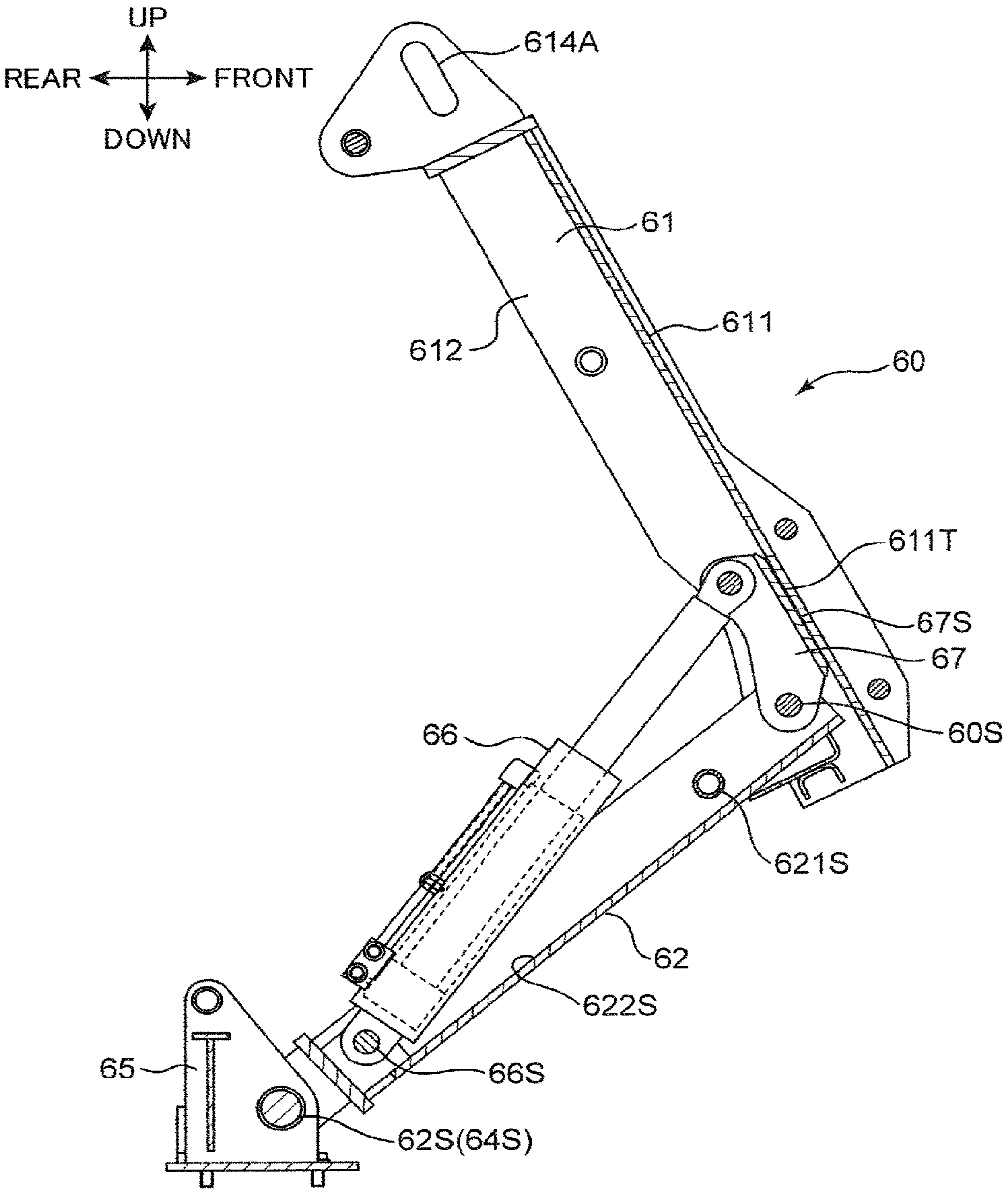
FIG. 10 is a side cross-sectional view of a backstop posture changing device in a crane according to an embodiment of the present invention.
Figure 11:
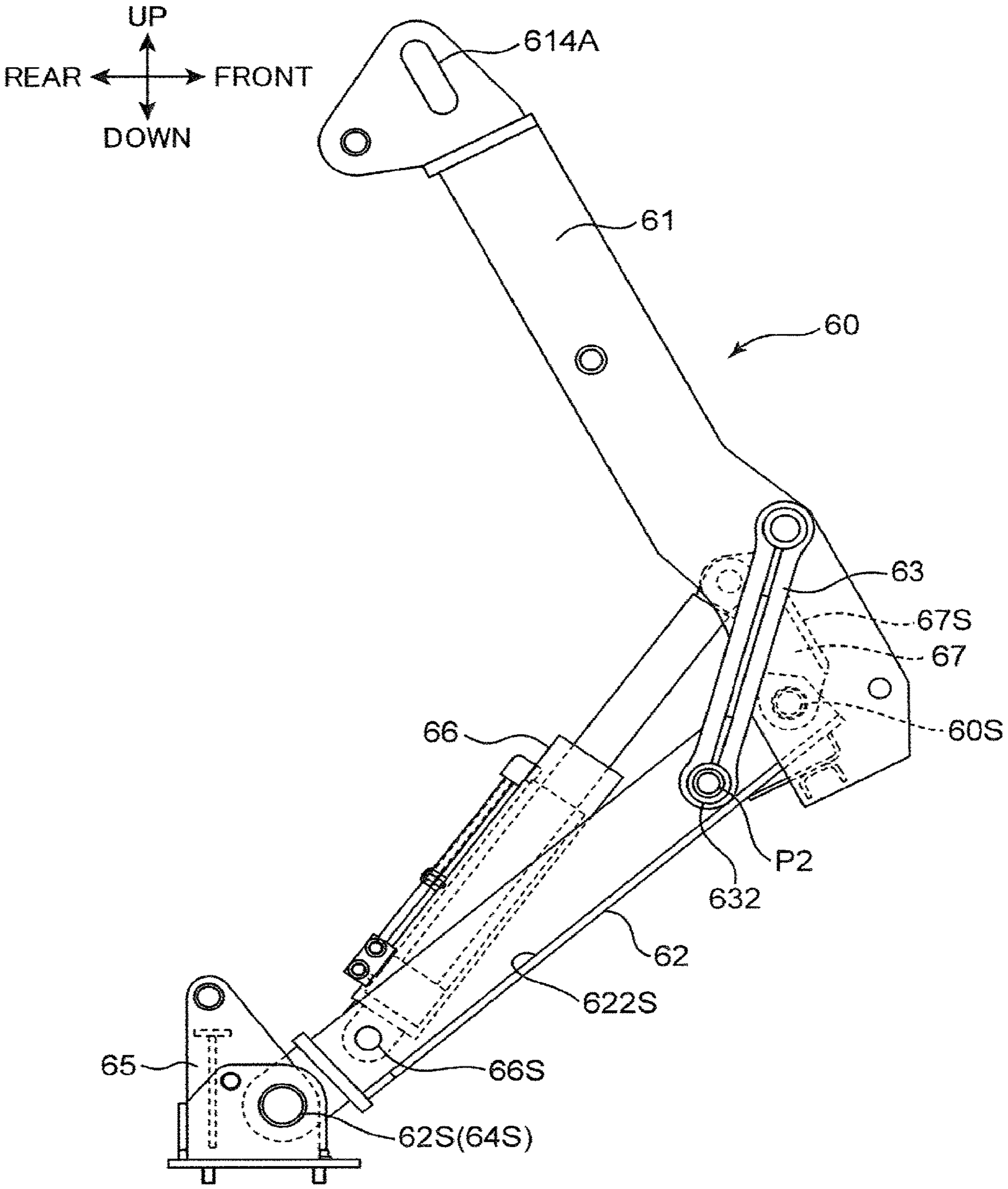
FIG. 11 is a side view of a backstop posture changing device in a crane according to an embodiment of the present invention.

Finally, as shown in FIG. 10, the angle formed by the first arm 61 and the second arm 62 reaches the first angle θ1. As a result, the backstop 45 is in the support posture. At this time, the stopper hole portion 632B opened at the stopper tip portion 632 of the stopper 63 coincides with the stopper fixing hole 621S of the second arm 62. Therefore, the operator climbs up on the lower boom 16A, and inserts the arm fixing pin P2 into the stopper hole portion 632B and the stopper fixing hole 621S (FIG. 11). As a result, the relative angle between the first arm 61 and the second atm 62 is maintained at the first angle θ1, and the backstop 45 is held in the support posture.

Figure 12:
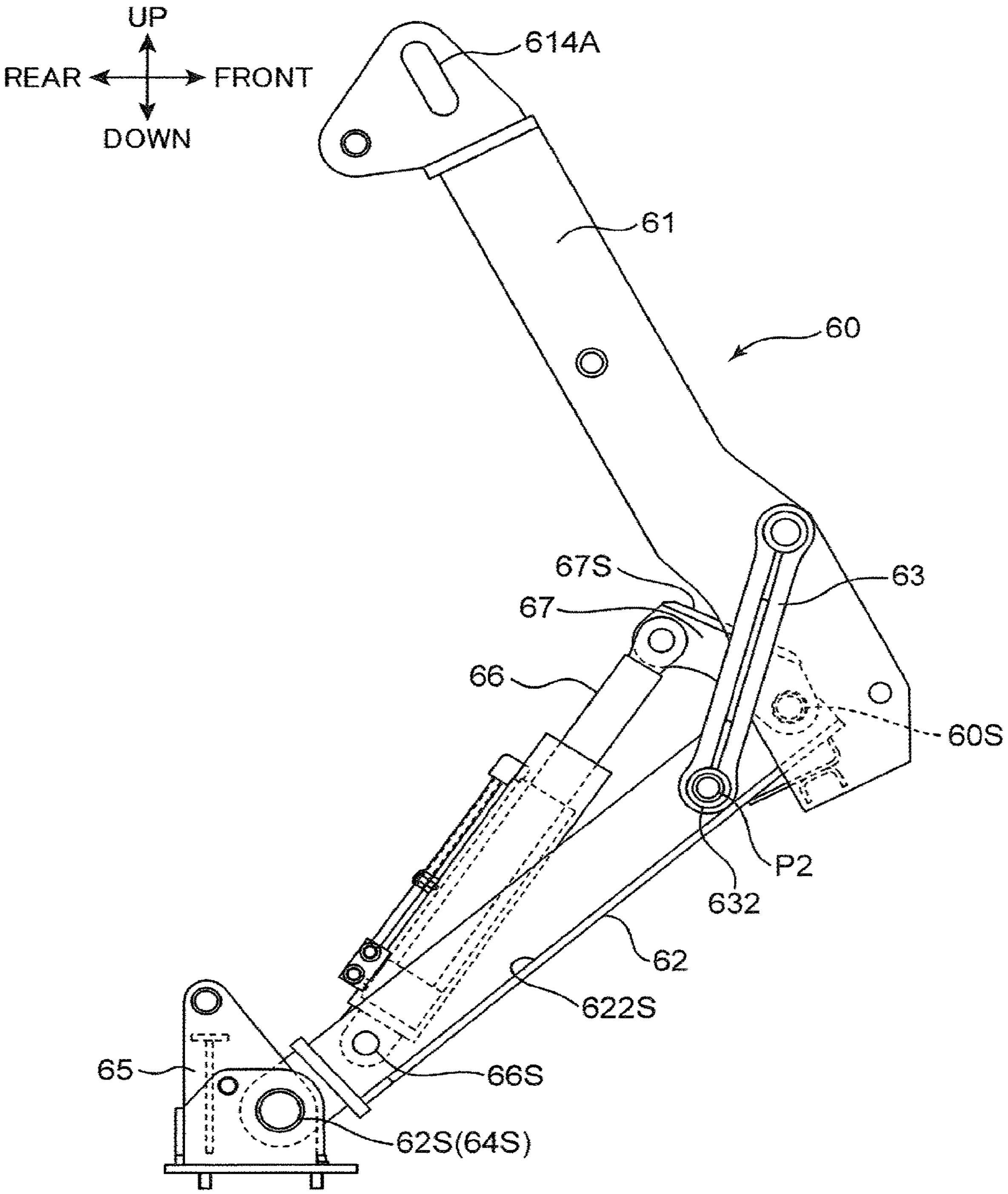
FIG. 12 is a side view of a backstop posture changing device in a crane according to an embodiment of the present invention.
Figure 13:
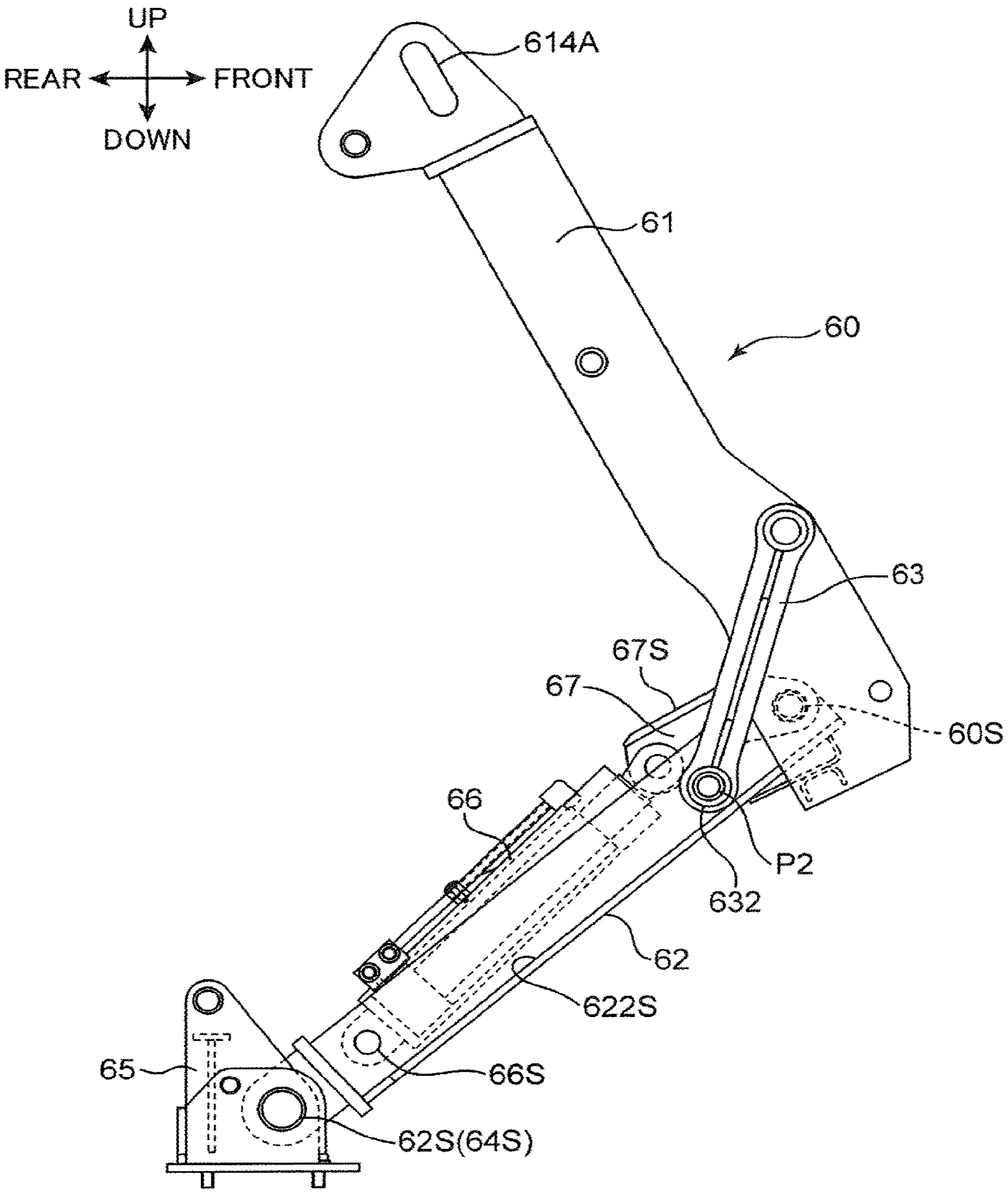
FIG. 13 is a side view of a backstop posture changing device in a crane according to an embodiment of the present invention.

Next, the operator turns on the switch 802 (see FIG. 14) connected to the control unit 80 to contract the cylinder rod 662 with respect to the cylinder body 661. As a result, as shown in FIGS. 12 and 13, in a state in which the posture of the backstop 45, the first arm 61, and the second arm 62 is maintained, in other words, in a state where the first arm 61 is left, the cylinder rod 662 is separated from the first arm 61 and is stored again in the cylinder body 661. At this time, the tip outer peripheral portion 632A of the stopper tip portion 632 of the stopper 63 moves on the stopper guide portion 622S of the second arm 62 similarly as described above. When the backstop 45 becomes in the storage state shown in FIG. 2, the stopper restricting portion 621P is positioned above the stopper tip portion 632 (FIG. 6). In other words, with the contraction operation of the cylinder rod 662, the stopper tip portion 632 moves to enter the lower side of the stopper restricting portion 621P. As a result, after the operator fixes the first connection portion 614 of the first arm 61 and the first arm fixing portion 65 by the lifting device fixing pin P1, the stopper tip portion 632 of the stopper 63 is prevented from being largely sprung up upward during transportation of the crane 10 (the boom 16 and the lower boom 16A).

In the case of changing the posture of the backstop 45 from the support posture to the storage posture at the time of disassembling the crane 10, the cylinder rod 662 may extend again from the state of FIG. 13 with respect to the cylinder body 661, so that the push-up portion 67S may be brought into contact with the pushed-up portion 611T of the first arm 61. Thereafter, when the arm fixing pin P2 is detached and the cylinder rod 662 contracts with respect to the cylinder body 661, the first arm 61 and the second arm 62 are bent so as to form the second angle θ2 while the push-up portion 67S supports the pushed-up portion 611T, and the posture of the backstop 45 is changed to the storage posture. Then, the operator connects the first connection portion 614 and the first arm fixing portion 65 by the lifting device fixing pin P1, and the backstop 45 is held in the storage posture.

Figure 14:
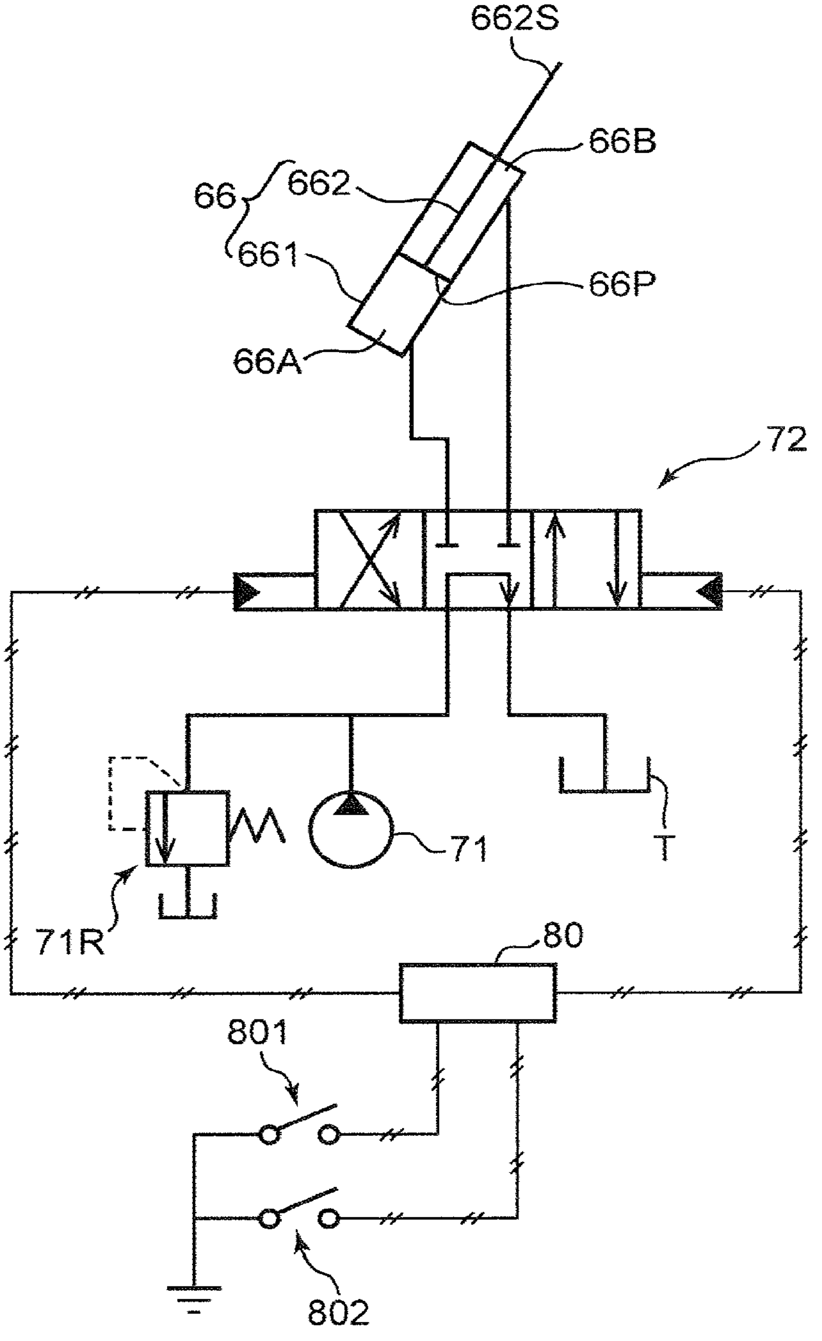
FIG. 14 is a schematic diagram showing a hydraulic circuit of a backstop posture changing device in a crane according to an embodiment of the present invention.

FIG. 14 is a schematic diagram illustrating a hydraulic circuit of the backstop lifting device 60 in the crane 10 according to the present embodiment. As shown in FIG. 14, the cylinder rod 662 of the lifting cylinder 66 has a piston portion 66P that divides the internal space of the cylinder body 661 into the head chamber 66A and the rod chamber 66B and is movable in the internal space. The backstop lifting device 60 includes a hydraulic pump 71, a relief valve 71R, and a direction control valve 72.

The hydraulic pump 71 can discharge hydraulic oil supplied to the head chamber 66A and the rod chamber 66B of the cylinder body 661.

The direction control valve 72 is disposed between the hydraulic pump 71 and the cylinder body 661. When the pair of solenoids receive the command signal from the control unit 80, the direction control valve 72 can be switched between the extension position, the contraction position, and the neutral position. Specifically, as shown in FIG. 14, when the operator turns on the switch 801 connected to the control unit 80, the direction control valve 72 is switched to the extension position, and when the operator turns on the switch 802, the direction control valve 72 is switched to the contraction position. In the extension position (the position on the left side of FIG. 14), the direction control valve 72 supplies the hydraulic oil discharged from the hydraulic pump 71 to the head chamber 66A and guides the hydraulic oil discharged from the rod chamber 66B to the tank T to extend the cylinder rod 662 with respect to the cylinder body 661. Further, in the contraction position (the position on the right side of FIG. 14), the direction control valve 72 supplies the hydraulic oil discharged from the hydraulic pump 71 to the rod chamber 66B and guides the hydraulic oil discharged from the head chamber 66A to the tank T to contract the cylinder rod 662 with respect to the cylinder body 661. In the neutral position (the center position of FIG. 14), the direction control valve 72 prevents the hydraulic oil discharged from the hydraulic pump 71 from being supplied to the head chamber 66A and the rod chamber 66B, and prevents the hydraulic oil from being discharged from the head chamber 66A and the rod chamber 66B. When the direction control valve 72 is set to the neutral position, some of the hydraulic oil in the head chamber 66A and the rod chamber 66B may leak from a part of the piping of the hydraulic circuit, but at least the predetermined time period, the state in which the cylinder rod 662 most extends with respect to the cylinder body 661, in other words, the state in which the first arm 61 and the second arm 62 form the first angle 81 can be maintained at least for a predetermined time. When the direction control valve 72 is switched to the neutral position (the position at the center of FIG. 14), the hydraulic oil discharged from the hydraulic pump 71 is directly discharged to the tank.

As described above, in the present embodiment, when the cylinder rod 662 of the lifting cylinder 66 extends with respect to the cylinder body 661 from the state in which the backstop 45 is in the storage posture on the lower boom 16A, the push-up member 67 pushes up the pushed-up portion 611T of the first arm 61, so that the first arm 61 rotates relative to the second arm 62, and the backstop 45 can be changed to the support posture. Therefore, relative to a case of changing the posture of the backstop 45 by the other auxiliary crane or a case of changing the posture of the backstop 45 by the operator directly with human power, the backstop 45 of the crane 10 can be easily and safely changed between the support posture and the storage posture. Further, when the backstop 45 is in the support posture, the stopper 63 connects the first arm 61 and the second arm 62 to each other, and can hold the relative posture of both members. Therefore, even when the own weight of the boom 16 is applied to the backstop 45 during the work of the crane 10, a large force is prevented from being applied to the cylinder portion of the lifting cylinder 66, and damage to the cylinder portion is suppressed. In addition, in order to receive the own weight of the boom 16, the necessity to increase the strength of the lifting cylinder 66 is decrease.

In the present embodiment, the push-up member 67 is rotatably supported by the rod tip portion 662S of the cylinder rod 662 and the second arm 62 at the first fulcrum portion 671 and the second fulcrum portion 672, respectively. Therefore, with respect to a direction in which the cylinder rod 662 extends and contracts with respect to the cylinder body 661, a direction in which the push-up portion 67S pushes up the pushed-up portion 611T of the first arm 61 can be relatively changed, and the relative angle between the first arm 61 and the second arm 62 can be changed according to the extension/contraction motion in one direction of the cylinder rod 662, and the posture of the backstop 45 can be reliably changed.

Further, in the present embodiment, the push-up member 67 rotates around the first fulcrum portion 671 and the second fulcrum portion 672, and can be separated from the pushed-up portion 611T according to the contraction of the cylinder rod 662 with respect to the cylinder body 661 in a state where the stopper 63 holds the relative posture of the first arm 61 and the second arm 62. Therefore, the cylinder rod 662 can be accommodated in the cylinder body 661 while the backstop 45 is kept in the support posture. Therefore, even when the own weight of the boom 16 is applied to the backstop 45 during the work of the crane 10, a large force is prevented from being applied to the cylinder portion of the lifting cylinder 66, and damage to the cylinder portion is suppressed. Further, it is suppressed that the cylinder rod 662 is left to stand for a long period of time in a state where the cylinder rod 662 extends from the cylinder body 661, and occurrence of damage such as rust on the cylinder rod 662 is suppressed. Further, since the cylinder rod 662 can be held in the oil immersion state for a long period in the cylinder body 661, the occurrence of rust or the like is further reduced. Since the push-up portion 67S can be separated from the pushed-up portion 611T, the cylinder rod 662 including the push-up member 67 may be contracted by its own weight.

In the present embodiment, the lifting device fixing pin P1 can connect the first connection portion 614 of the first arm 61 and the first arm fixing portion 65 (the lower boom 16A, the boom 16) detachably to each other so as to hold the backstop 45 in the storage posture in a state where the cylinder rod 662 is contracted with respect to the cylinder body 661. Therefore, the relative posture of the first arm 61 and the second arm 62 can be maintained in the storage posture of the backstop 45, and the backstop 45 is prevented from jumping upward from the boom 16 during transportation of the boom 16.

Further, in the present embodiment, since the stopper fulcrum portion 631 of the stopper 63 is rotatably supported by the first arm 61, it is easy to transport and store the backstop lifting device 60 as compared with a case where the stopper 63 is detached from both the first arm 61 and the second arm 62. Further, since the stopper guide portion 622S can guide the stopper tip portion 632 of the stopper 63 to the stopper fixing hole 621S according to the extension operation of the cylinder rod 662, it is not necessary for the operator to move the stopper 63, and the first arm 61 and the second atm 62 can be easily connected.

In addition, in the present embodiment, the stopper restricting portion 621P restrains the stopper tip portion 632 of the stopper 63 at the standby position so as to prevent the stopper 63 from rotating largely around the stopper fulcrum portion 631 in a state in which the backstop 45 is in the storage posture. The stopper restricting portion 621P allows the stopper tip portion 632 of the stopper 63 to move from the standby position toward the stopper fixing hole 621S as the cylinder rod 662 extends relative to the cylinder body 661. Therefore, since the stopper restricting portion 621P can restrain the stopper 63 in a state in which the backstop 45 is in the storage posture, the lower boom 16A (boom 16) including the backstop 45 can be safely transported and stored.

In the present embodiment, the direction control valve 72 has a neutral position in addition to the extension position and the contraction position corresponding to the extension/contraction motion of the cylinder rod 662. Therefore, when the cylinder rod 662 extends and the first arm 61 and the second arm 62 are arranged so as to form the first angle θ1, the direction control valve 72 is set to the neutral position, whereby the relative posture of the first arm 61 and the second arm 62 can be maintained for a predetermined time by the retention of the hydraulic oil. Therefore, the first arm 61 and the second arm 62 can be connected to each other by the stopper 63 using the predetermined time, and another predetermined time for supporting the first arm 61 and the second arm 62 by the other auxiliary crane when the operator connects the stopper 63 is not required.

The backstop lifting device 60 of the crane 10 according to the embodiment of the present invention has been described above. It should be noted that the present invention is not limited to these embodiments. In the present invention, the following modified embodiments are possible.

Figure 15:
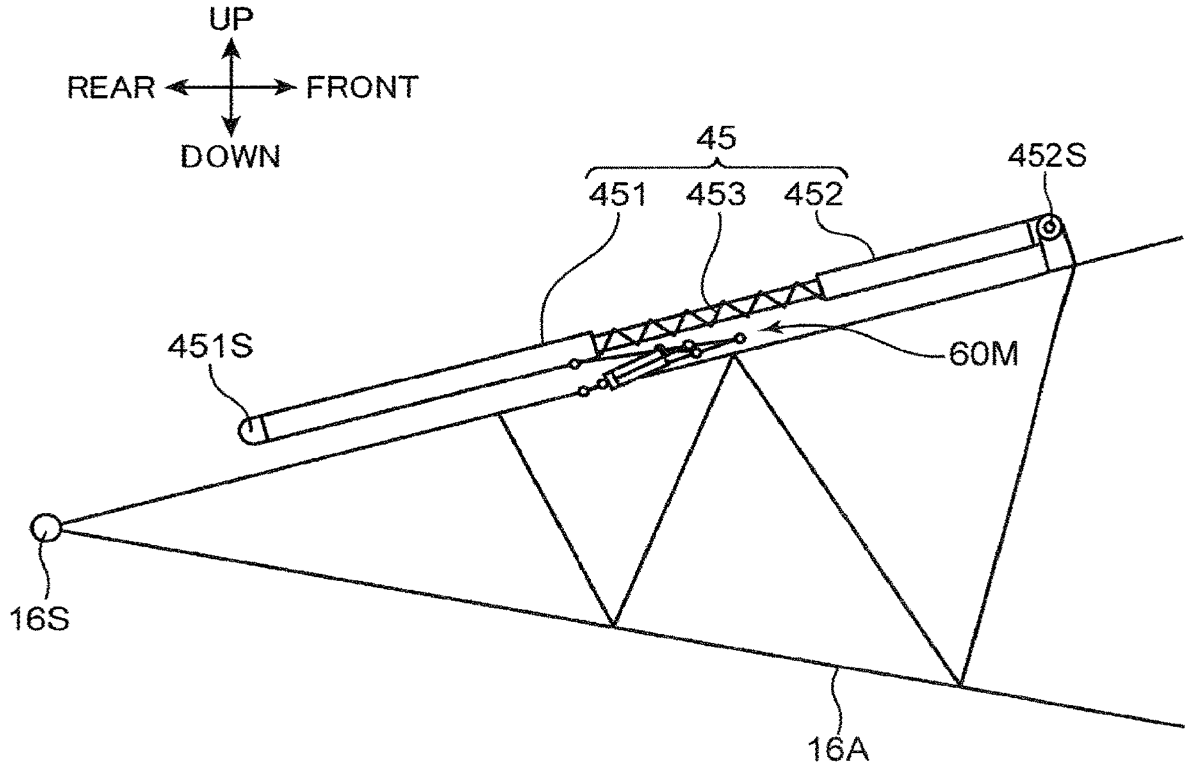
FIG. 15 is a schematic side view of a lower boom and a backstop in a state in which a boom of a crane according to a modified embodiment of the present invention is in a falling posture.
Figure 16:
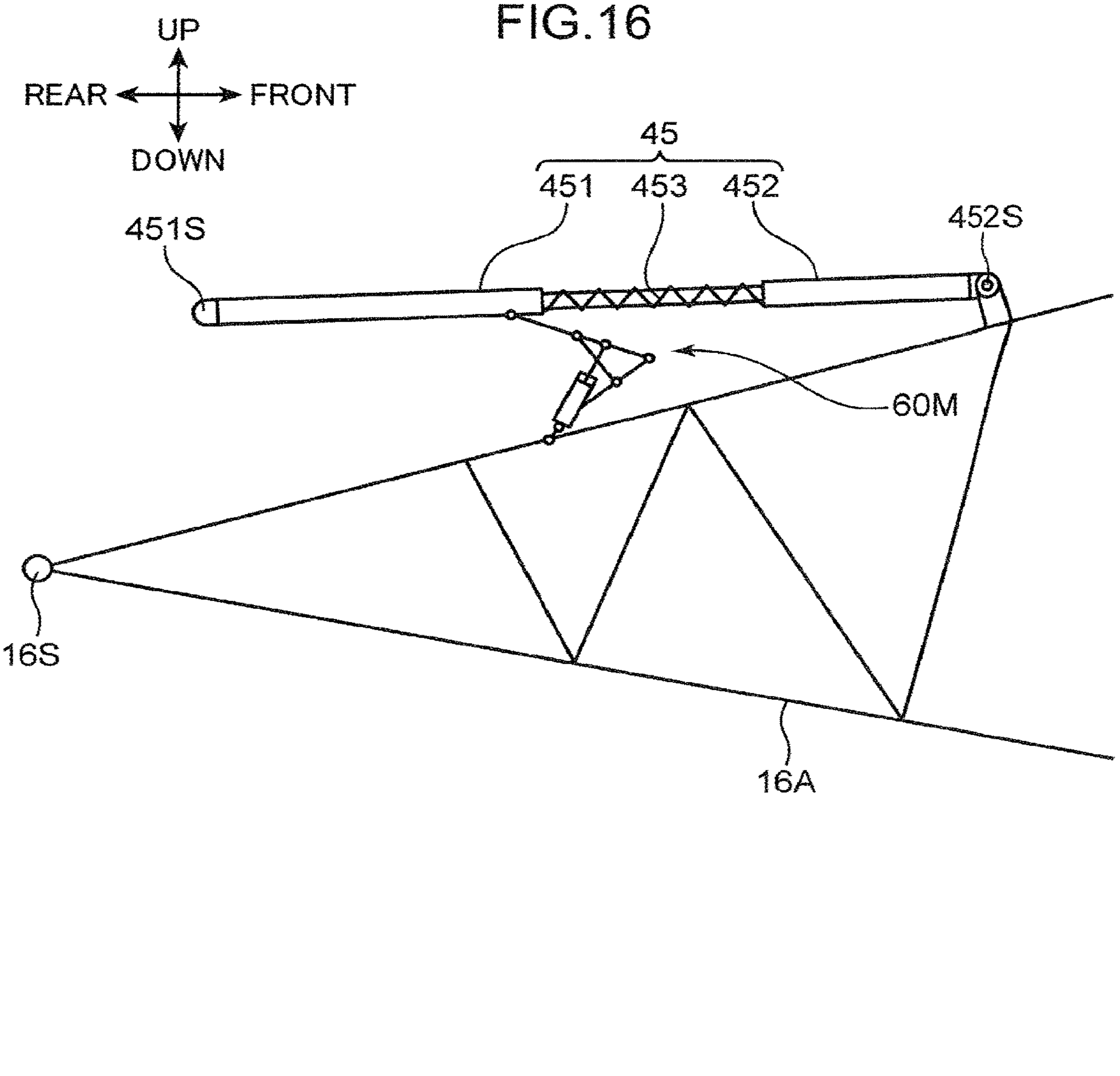
FIG. 16 is a schematic side view of a lower boom and a backstop in a state in which a boom of a crane according to a modified embodiment of the present invention is in a falling posture.
Figure 17:
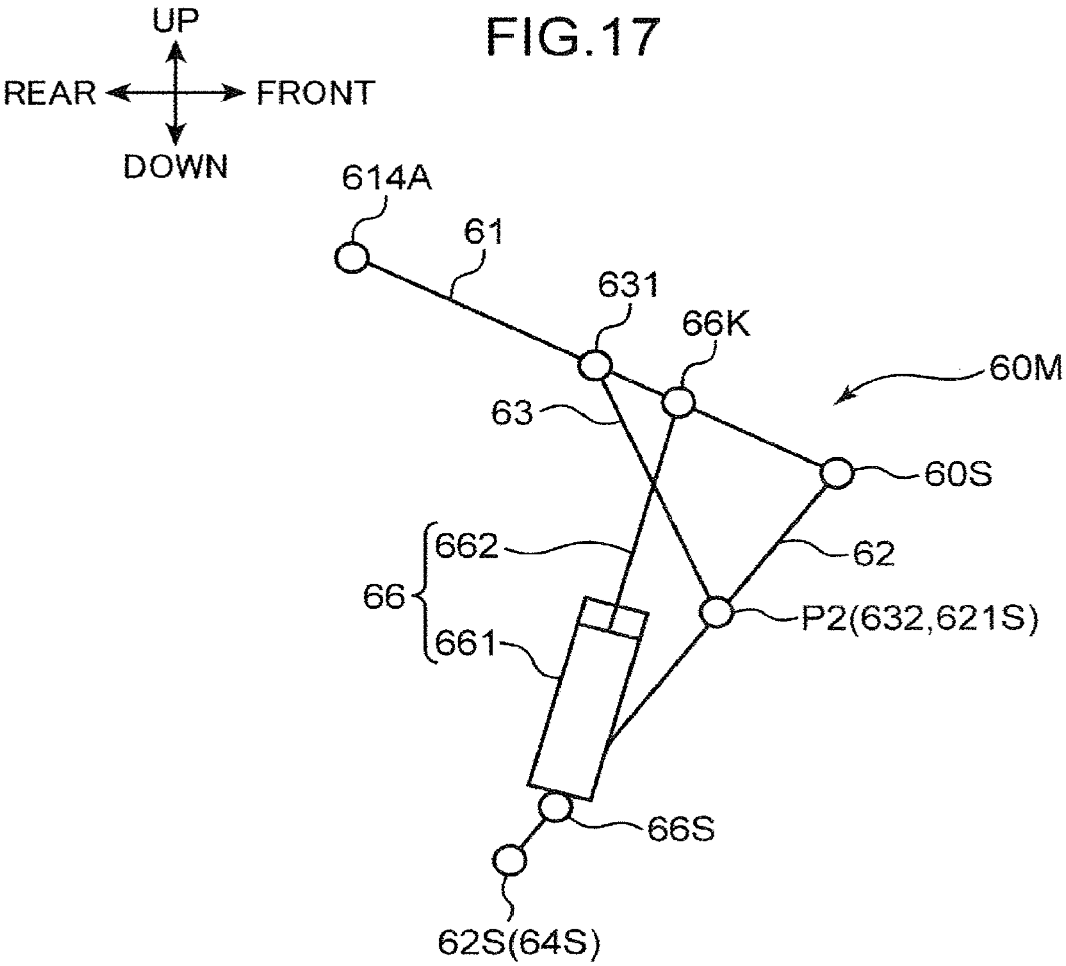
FIG. 17 is a schematic side view of a backstop posture changing device for a crane according to a modified embodiment of the present invention.

(1) FIG. 15 and FIG. 16 are schematic side views of the lower boom 16A and the backstop 45 in a state in which the boom of the crane according to the modified embodiment of the present invention is in a falling posture. FIG. 17 is a schematic side view of the backstop lifting device 60M of the crane according to the present modified embodiment. In the above-described embodiment, the lifting cylinder 66 has a push-up member 67 connected to the distal end portion of the cylinder rod 662. In the present modified embodiment, as shown in FIG. 17, the tip portion 66K of the cylinder rod 662 is rotatably supported around a rotation center axis extending in the left-right direction at a portion between the arm fulcrum portion 60S and the connecting opening 614A of the first arm 61. The tip portion 66K functions as a push-up member for pushing up the first arm 61 (pushed-up portion 611T). In this case, in the support posture of the backstop 45, the tip portion 66K is always connected to the first arm 61.

In the present modified embodiment, by extending the cylinder rod of the push-up mechanism with respect to the cylinder body from a state in which the backstop is in the storage posture (FIG. 15), the push-up member pushes up the push up pushed-up portion of the first support member, so that the first support member can be rotated relative to the second support member, and the backstop can be changed to the support posture (FIG. 16).

(2) In the above-described embodiment, the backstop 45 is described in a mode in which the backstop 45 is disposed on the boom 16, but the backstop 46 of FIG. 1 may be moved up and down by the backstop lifting device 60. In this case, the backstop lifting device 60 is disposed so as to be interposed between the lattice mast 17 and the backstop 46. The crane according to the present invention is not limited to the structure shown in FIG. 1. Also, the backstop which is changed in posture by the backstop lifting device 60 may maintain the posture of a jib, a strut, or the like (not shown).

(3) The stopper 63 is not limited to a mode in which the stopper 63 is rotatably supported by the first arm 61 around the stopper fulcrum portion 631, and may be detachably attached to the first arm 61 and the second at arm 62. In this case, the connecting pins may be inserted into two positions of the stopper fulcrum portion 631 and the stopper tip portion 632.

(4) In the above-described embodiment, the crane 10 shown in FIG. 1 has been described, but the present invention is not limited thereto, and can also be applied to a crane having another structure. That is, the crane to which the present invention is applied may be provided with a gantry as a general-purpose crane instead of the lattice mast, and the derricking winch may be disposed on the upper frame (rear side) of the upper turning body 12. In addition, as a large-sized crane, the structure may be a structure in which the boom is raised and lowered by the undulation of the box mast instead of the SHL structure. In this case, the sheave block may not be provided, and the distal end portion of the box mast and the tip portion of the boom may be directly connected by the guy link. Further, both of the general-purpose crane and the large-sized crane may be one in which a jib or a strut is attached to the tip of the boom. In the above-described embodiment, the backstop of the boom has been described. However, the present invention can also be applied to a backstop provided in each of a mast (lattice mast), a strut (a rear strut, a front strut), and a jib.

A backstop posture changing device for a crane according to an embodiment of the present invention can be mounted on the crane having: a crane body; a derricking body including a derricking body base end portion rotatably supported by the crane body in a derricking direction, and a derricking body distal end portion on the opposite side of the derricking body base end portion; and a backstop including a backstop base end portion rotatably supported around a horizontal reference rotation center axis at a portion of the derricking body between the derricking body distal end portion and the derricking body base end portion, and a backstop distal end portion disposed on the opposite side of the backstop base end portion. The backstop posture changing device of the crane can change the posture of the backstop between a support posture and a storage posture by turning the backstop with the backstop base end portion as a fulcrum in a falling state of the derricking body that is a state where the derricking body is fallen with respect to the crane body. In the support posture, the backstop extends obliquely upward from the derricking body in such a manner that the backstop distal end portion of the backstop contacts with the crane body in accordance with the rising of the derricking body from the falling state, thereby the backstop restricts the falling of the derricking body backward. In the storage posture, the backstop distal end portion of the backstop is disposed closer to the derricking body than the backstop distal end portion in the support posture. Further, the backstop posture changing device of the crane includes a first support member having a first base end portion connected to a portion of the backstop between the backstop distal end portion and the backstop base end portion so as to be rotatable around a first rotation center axis parallel to the reference rotation center axis, a first rotation end portion opposite to the first base end portion, and a pushed-up portion disposed between the first base end portion and the first rotation end portion. The backstop posture changing device of the crane further includes a second support member having a second base end portion connected to a portion of the derricking body between the derricking body base end portion and the backstop base end portion so as to be rotatable around a second rotation center axis parallel to the reference rotation center axis, and a second rotation end portion disposed on the opposite side of the second base end portion and connected to the first rotation end portion of the first support member so as to be relatively rotatable around an intermediate rotation center axis parallel to the reference rotation center axis. The second support member can be arranged such that a first straight line connecting the first rotation center axis and the intermediate rotation center axis and a second straight line connecting the second rotation center axis and the intermediate rotation center axis form a first angle, thereby the second support member maintain the backstop in the support posture together with the first support member. The second support member can be arranged such that the first straight line and the second straight line form a second angle of an acute angle smaller than the first angle, thereby the second support member maintain the backstop in the storage posture together with the first support member. The backstop posture changing device of the crane further includes a push-up mechanism disposed so as to be interposed between the first support member and the second support member, and including: a cylindrical cylinder body having a base end portion supported by the second support member so as to be rotatable around a first cylinder rotation center axis parallel to the reference rotation center axis; and a cylinder rod inserted into the cylinder body so as to extend and contract with respect to the cylinder body on a side opposite to the base end portion; and a push-up member disposed at a distal end portion of the cylinder rod and capable of pushing up the pushed-up portion of the first support member to rotate the first support member relative to the second support member around the intermediate rotation center axis in accordance with the extending of the cylinder rod with respect to the cylinder body from a state where the first straight line and the second straight line form the second angle, thereby the first straight line and the second straight line form the first angle. The backstop posture changing device of the crane further includes a connection member detachably attached to at least one of the first support member and the second support member, and capable of connecting the first support member and the second support member to each other so as to hold a state in which the first straight line and the second straight line form the first angle and the backstop is in the support posture.

According to this configuration, when the cylinder rod of the push-up mechanism extends with respect to the cylinder body from the state in which the backstop is in the storage posture on the derricking body, the push-up member pushes up the pushed-up portion of the first support member to relatively rotate the first support member with respect to the second support member, and the backstop can be changed to the support posture. Therefore, it is possible to easily and safely change the posture of the backstop of the crane from the storage posture to the support posture in comparison with the case where the posture of the backstop is changed by the other auxiliary crane or the case where the operator changes the posture of the backstop by human power. Further, when the backstop is set to the support posture, the connection member connects the first support member and the second support member to each other to hold the relative posture of both members. Therefore, even when the self-weight of the derricking body is applied to the backstop during the work of the crane, a large force is prevented from being applied to the cylinder portion of the push-up mechanism, and damage to the cylinder portion is suppressed.

Preferably, the push-up member includes a first supported portion supported by the distal end portion of the cylinder rod so as to be rotatable around a second cylinder rotation center axis parallel to the reference rotation center axis, a second supported portion supported by the second support member so as to be rotatable around the intermediate rotation center axis, and a push-up portion disposed between the first supported portion and the second supported portion and capable of pushing up the pushed-up portion of the first support member as the cylinder rod extends relative to the cylinder body.

According to this configuration, the push-up member is rotatably supported by the distal end portion of the cylinder rod and the second support member in the first supported portion and the second supported portion. Therefore, a direction in which the push-up portion pushes up the pushed-up portion of the first support member can be relatively changed with respect to a direction in which the cylinder rod extends and contracts with respect to the cylinder body, and the relative angle between the first support member and the second support member can be changed according to the extension motion in one direction of the cylinder rod, and the posture of the backstop can be changed.

In the above configuration, it is desirable that the push-up portion can be separated from the pushed-up portion in association with contraction of the cylinder rod with respect to the cylinder body in a state where the connection member holds the relative posture of the first support member and the second support member.

According to this configuration, the cylinder rod can be accommodated in the cylinder body while the backstop is kept in the support posture. Therefore, even when the self-weight of the derricking body is applied to the backstop during the work of the crane, a large force is prevented from being applied to the cylinder portion of the push-up mechanism, and damage to the cylinder portion is suppressed. Further, it is suppressed that the cylinder rod is left to stand for a long period of time in a state where the cylinder rod is extended from the cylinder body, and generation of rust on the cylinder rod is suppressed.

In the above configuration, it is desirable to further include a storage connection member capable of detachably connecting the first base end portion of the first support member and the derricking body so as to hold the backstop in the storage posture in a state where the cylinder rod is contracted with respect to the cylinder body.

According to this configuration, in the storage posture of the backstop, the storage connection member can hold the relative posture of the first support member and the second support member, and the backstop is prevented from jumping upward from the derricking body during transportation of the derricking body.

In the above configuration, it is desirable that the connection member includes a connection base end portion rotatably supported around a connection rotation center axis parallel to the reference rotation center axis at a portion of the first support member between the first base end portion and the first rotation end portion, and a connection distal end portion disposed on a side opposite to the connection base end portion. And it is desirable that the second support member includes a connected portion disposed between the second base end portion and the second rotation end portion and allowing the connection distal end portion to be detachably connected to the connected portion so as to hold the support posture of the backstop, and a guide portion that holds the connection distal end portion at a standby position that is a position closer to the second base end portion than the connected portion in the storage posture of the backstop and guides the connection distal end portion of the connection member that rotates around the connection rotation center axis from the standby position to the connected portion as the cylinder rod extends relative to the cylinder body.

According to this configuration, since the connection base end portion of the connection member is rotatably supported by the first support member, compared with a case where the connection member is detached from both the first support member and the second support member, transportation and storage of the backstop posture change device can be facilitated. In addition, since the guide portion can guide the connection distal end portion of the connection member to the connected portion according to the extension operation of the cylinder rod, it is not necessary for the operator to move the connection member, and the first support member and the second support member can be easily connected.

In the above configuration, it is preferable that the second support member further includes a connection member restraint portion that restricts the connection distal end portion of the connection member at the standby position so as to prevent the connection member from rotating around the connection rotation center axis in a state in which the backstop is in the storage posture, and allows the connection distal end portion to move from the standby position toward the connected portion as the cylinder rod extends relative to the cylinder body.

According to this configuration, since the connection member restraint portion can restrain the connection distal end portion of the connection member in a state in which the backstop is in the storage posture, the rotation of the connection member is suppressed, and the derricking body including the backstop can be safely transported and stored.

In the above configuration, it is preferable that the cylinder rod includes a piston portion dividing an internal space of the cylinder body into a bead chamber and a rod chamber and movable in the internal space. And it is preferable to further include a hydraulic pump capable of discharging hydraulic oil supplied to the head chamber and the rod chamber, and a directional control valve disposed between the hydraulic pump and the cylinder body. The position of the directional control valve is changeable between an extension position, a contraction position and a neutral position. In the extension position, the directional control valve supplies the hydraulic oil discharged from the hydraulic pump to the head chamber and guides the hydraulic oil discharged from the rod chamber to the tank, thereby the cylinder rod extends relative to the cylinder body. In the contraction position, the directional control valve supplies the hydraulic oil discharged from the hydraulic pump to the rod chamber and guides the hydraulic oil discharged from the head chamber to the tank, thereby the cylinder rod contracts with respect to the cylinder body. In the neutral position, the directional control valve prevents the hydraulic oil discharged from the hydraulic pump from being supplied to the head chamber and the rod chamber and prevents the hydraulic oil from being discharged from the head chamber and the rod chamber, respectively.

According to this configuration, the directional control valve has a neutral position in addition to the extension position and the contraction position corresponding to the extending and contracting motion of the cylinder rod. Therefore, by setting the directional control valve to the neutral position in a state in which the cylinder rod extends and the first support member and the second support member are arranged so as to form the first angle, the relative posture of the first support member and the second support member can be maintained for a predetermined time by the retention of the hydraulic oil. Therefore, by using the predetermined time, the operator can connect the first support member and the second support member to each other by the connection member, and another predetermined time for holding the relative posture of the first support member and the second support member by the other auxiliary crane during the connection work of the connection member is not required.

According to the present invention, there is provided a backstop posture changing device for a crane capable of easily and safely changing a posture of a backstop of the crane between a support posture and a storage posture.

The invention claimed is:

1. A backstop posture changing device for crane, the crane including a crane body, a derricking body having a derricking body base end portion rotatably supported by the crane body in a derricking direction and a derricking body distal end portion on a side opposite to the derricking body base end portion, a backstop having a backstop base end portion supported so as to be rotatable around a horizontal reference rotation center axis at a portion of the derricking body between the derricking body distal end portion and the derricking body base end portion and a backstop distal end portion disposed on a side opposite to the backstop base end portion, the backstop posture changing device being configured to be attached to the derricking body and to change the posture of the backstop between a support posture and a storage posture by turning the backstop with the backstop base end portion as a fulcrum in a falling state of the derricking body that is a state where the derricking body is fallen with respect to the crane body, and, in the support posture, the backstop extending obliquely upward from the derricking body in such a manner that the backstop distal end portion of the backstop contacts with the crane body in accordance with the rising of the derricking body from the falling state, thereby the backstop restricts the falling of the derricking body backward, and, in the storage posture, the backstop distal end portion of the backstop being disposed closer to the derricking body than the backstop distal end portion in the support posture, the backstop posture changing device comprising:

a first support member having a first base end portion connected to a portion of the backstop between the backstop distal end portion and the backstop base end portion so as to be rotatable around a first rotation center axis parallel to the reference rotation center axis, a first rotation end portion opposite to the first base end portion, and a pushed-up portion disposed between the first base end portion and the first rotation end portion;

a second support member having a second base end portion connected to a portion of the derricking body between the derricking body base end portion and the backstop base end portion so as to be rotatable around a second rotation center axis parallel to the reference rotation center axis, and a second rotation end portion disposed on the opposite side of the second base end portion and connected to the first rotation end portion of the first support member so as to be relatively rotatable around an intermediate rotation center axis parallel to the reference rotation center axis, the second support member being arranged such that a first straight line connecting the first rotation center axis and the intermediate rotation center axis and a second straight line connecting the second rotation center axis and the intermediate rotation center axis form a first angle, thereby the second support member maintain the backstop in the support posture together with the first support member, and the second support member being arranged such that the first straight line and the second straight line form a second angle of an acute angle smaller than the first angle, thereby the second support member maintain the backstop in the storage posture together with the first support member;

a push-up mechanism disposed so as to be interposed between the first support member and the second support member and including a cylindrical cylinder body having a base end portion supported by the second support member so as to be rotatable around a first cylinder rotation center axis parallel to the reference rotation center axis, and a cylinder rod inserted into the cylinder body so as to extendable and contractable with respect to the cylinder body on a side opposite to the base end portion, and a push-up member disposed at a distal end portion of the cylinder rod and capable of pushing up the pushed-up portion of the first support member to rotate the first support member relative to the second support member around the intermediate rotation center axis in accordance with the extending of the cylinder rod with respect to the cylinder body from a state where the first straight line and the second straight line form the second angle, thereby the first straight line and the second straight line forming the first angle; and a connection member detachably attached to at least one of the first support member and the second support member and capable of connecting the first support member and the second support member to each other so as to hold a state in which the first straight line and the second straight line form the first angle and the backstop is in the support posture.

2. The backstop posture changing device for crane according to claim 1, wherein the push-up member includes:

a first supported portion supported by the distal end portion of the cylinder rod so as to be rotatable around a second cylinder rotation center axis parallel to the reference rotation center axis;

a second supported portion supported by the second support member so as to be rotatable around the intermediate rotation center axis; and a push-up portion disposed between the first supported portion and the second supported portion and capable of pushing up the pushed-up portion of the first support member as the cylinder rod extends relative to the cylinder body.

3. The backstop posture changing device for crane according to claim 1, wherein the push-up portion can be separated from the pushed-up portion in association with contraction of the cylinder rod with respect to the cylinder body in a state where the connection member holds the relative posture of the first support member and the second support member.

4. The backstop posture changing device for crane according to claim 1, further comprising a storage connection member capable of detachably connecting the first base end portion of the first support member and the derricking body so as to hold the backstop in the storage posture in a state where the cylinder rod is contracted with respect to the cylinder body.

5. The backstop posture changing device for crane according to claim 1, wherein the connection member includes:

a connection base end portion rotatably supported around a connection rotation center axis parallel to the reference rotation center axis at a portion of the first support member between the first base end portion and the first rotation end portion; and a connection distal end portion disposed on a side opposite to the connection base end portion, the second support member includes:

a connected portion disposed between the second base end portion and the second rotation end portion and allowing the connection distal end portion to be detachably connected to the connected portion so as to hold the support posture of the backstop; and a guide portion that holds the connection distal end portion at a standby position that is a position between the second base end portion and the connected portion in the storage posture of the backstop, and guides the connection distal end portion of the connection member that rotates around the connection rotation center axis from the standby position to the connected portion as the cylinder rod extends relative to the cylinder body.

6. The backstop posture changing device for crane according to claim 5, wherein the second support member further includes a connection member restraint portion that restrains the connection distal end portion of the connection member at the standby position so as to prevent the connection member from rotating around the connection rotation center axis in a state in which the backstop is in the storage posture, and allows the connection distal end portion to move from the standby position toward the connected portion as the cylinder rod extends relative to the cylinder body.

7. The backstop posture changing device for crane according to claim 1, wherein the cylinder rod includes a piston portion dividing an internal space of the cylinder body into a head chamber and a rod chamber and movable in the internal space, the backstop posture changing device further comprising:

a hydraulic pump capable of discharging hydraulic oil supplied to the head chamber and the rod chamber; and a directional control valve disposed between the hydraulic pump and the cylinder body, the position of the directional control valve is changeable between an extension position, a contraction position and a neutral position, in the extension position, the directional control valve supplies the hydraulic oil discharged from the hydraulic pump to the head chamber and guides the hydraulic oil discharged from the rod chamber to the tank, thereby the cylinder rod extends relative to the cylinder body, in the contraction position, the directional control valve supplies the hydraulic oil discharged from the hydraulic pump to the rod chamber and guides the hydraulic oil discharged from the head chamber to the tank, thereby the cylinder rod contracts with respect to the cylinder body, in the neutral position, the directional control valve prevents the hydraulic oil discharged from the hydraulic pump from being supplied to the head chamber and the rod chamber and prevents the hydraulic oil from being discharged from the head chamber and the rod chamber, respectively.

* * * * *